United States Patent
Bao et al.

(10) Patent No.: US 11,889,461 B2
(45) Date of Patent: Jan. 30, 2024

(54) REFERENCE SIGNAL TIME DIFFERENCE (RSTD) MEASUREMENT REPORT ENHANCEMENTS FOR MULTI-TIMING ERROR GROUP (TEG) REQUESTS

(71) Applicant: QUALCOMM Incorporated, San Diego, CA (US)

(72) Inventors: Jingchao Bao, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 17/489,143

(22) Filed: Sep. 29, 2021

(65) Prior Publication Data
US 2023/0101737 A1 Mar. 30, 2023

(51) Int. Cl.
*H04W 64/00* (2009.01)
*H04B 17/27* (2015.01)
*H04L 5/00* (2006.01)
*H04W 24/10* (2009.01)

(52) U.S. Cl.
CPC .......... *H04W 64/003* (2013.01); *H04B 17/27* (2015.01); *H04L 5/0048* (2013.01); *H04W 24/10* (2013.01)

(58) Field of Classification Search
CPC ... H04W 64/003; H04W 24/10; H04W 64/00; H04B 17/27; H04L 5/0048
See application file for complete search history.

(56) References Cited

U.S. PATENT DOCUMENTS

2021/0266773 A1* 8/2021 Lee .................. H04W 64/00
2022/0390546 A1* 12/2022 Cha .................. G01S 5/0244

FOREIGN PATENT DOCUMENTS

WO 2022081630 A1 4/2022

OTHER PUBLICATIONS

International Search Report and Written Opinion—PCT/US2022/074655—ISA/EPO—dated Oct. 27, 2022.
Mediatek Inc: "Mitigation of RX/TX timing delays for higher accuracy", 3GPP TSG-RAN WG1 #105-e, R1-2105759, 3rd Generation Partnership Project, Mobile Competence Centre, 650, Route Des Lucioles, F-06921 Sophia-Antipolis Cedex, France, vol. RAN WG1, No. e-meeting, May 10, 2021-May 27, 2021, May 12, 2021, 8 Pages, XP052011684.

(Continued)

*Primary Examiner* — Kabir A Timory
(74) *Attorney, Agent, or Firm* — QUALCOMM Incorporated

(57) ABSTRACT

Disclosed are techniques for wireless positioning. In an aspect, a first network node receives a measurement request from a location server, the measurement request requesting the first network node to measure a positioning reference signal (PRS) resource from at least one second network node using a plurality of receive timing error groups (Rx TEGs) of the first network node, and transmits a measurement report to the location server, the measurement report including a plurality of positioning measurements based on the PRS resource, the plurality of positioning measurements corresponding to the plurality of Rx TEGs.

30 Claims, 15 Drawing Sheets

(56) References Cited

OTHER PUBLICATIONS

Moderator (CATT) : "FL Summary #2 for Accuracy Improvements by Mitigating UE Rx/Tx and/or gNB Rx/Tx Timing Delays", R1-2108242, 3rd Generation Partnership Project, Mobile Competence Centre, 650, Route Des Lucioles, F-06921 Sophia-Antipolis Cedex, France, vol. RAN WG1, No. e-meeting, Aug. 16, 2021-Aug. 27, 2021, Aug. 20, 2021, 75 Pages, XP052041736.

Moderator(CATT): "FL Summary #4 for Accuracy Improvements by Mitigating UE Rx/Tx and/or gNB Rx/Tx Timing Delays", 3GPP TSG RAN WG1 Meeting #104bis-e, R1-2103992, 3rd Generation Partnership Project, Mobile Competence Centre, 650, Route Des Lucioles, F-06921 Sophia-Antipolis Cedex, France, vol. RAN WG1, No. e-meeting, Apr. 12, 2021-Apr. 20, 2021, Apr. 20, 2021, XP051996599, 85 Pages, section 2/Agreement, section 3/Submitted, Proposals (specific for UL positioning).

Qualcomm Incorporated: "Enhancements on Timing Error Mitigations for Improved Accuracy", 3GPP TSG RAN WG1 #106-e, R1-2107345, 3rd Generation Partnership Project, Mobile Competence Centre, 650, Route Des Lucioles, F-06921, Sophia-Antipolis Cedex, France, vol. RAN WG1, No. e-Meeting, Aug. 16, 2021-Aug. 27, 2021, Aug. 6, 2021, 17 Pages, XP052038293.

\* cited by examiner

```
NR-DL-TDOA-SignalMeasurementInformation-r16 ::= SEQUENCE {
    dl-PRS-ReferenceInfo-r16            DL-PRS-ID-Info-r16,
    nr-DL-TDOA-MeasList-r16             NR-DL-TDOA-MeasList-r16,
    ...
}

NR-DL-TDOA-MeasList-r16 ::= SEQUENCE (SIZE(1..nrMaxTRPs-r16)) OF NR-DL-TDOA-MeasElement-r16

NR-DL-TDOA-MeasElement-r16 ::= SEQUENCE {
    dl-PRS-ID-r16                       INTEGER (0..255),
    nr-PhysCellID-r16                   NR-PhysCellID-r16                       OPTIONAL,
    nr-CellGlobalID-r16                 NCGI-r15                                OPTIONAL,
    nr-ARFCN-r16                        ARFCN-ValueNR-r15                       OPTIONAL,
    nr-DL-PRS-ResourceID-r16            NR-DL-PRS-ResourceID-r16                OPTIONAL,
    nr-DL-PRS-ResourceSetID-r16         NR-DL-PRS-ResourceSetID-r16             OPTIONAL,
    nr-TimeStamp-r16                    NR-TimeStamp-r16,
    nr-RSTD-r16                         CHOICE {
        k0-r16                              INTEGER (0..1970049),
        k1-r16                              INTEGER (0..985025),
        k2-r16                              INTEGER (0..492513),
        k3-r16                              INTEGER (0..246257),
        k4-r16                              INTEGER (0..123129),
        k5-r16                              INTEGER (0..61565),
        ...
    },
    nr-AdditionalPathList-r16           NR-AdditionalPathList-r16               OPTIONAL,
    nr-TimingQuality-r16                NR-TimingQuality-r16,
    nr-DL-PRS-RSRP-Result-r16           INTEGER (0..126)                        OPTIONAL,
    nr-DL-TDOA-AdditionalMeasurements-r16
                                        NR-DL-TDOA-AdditionalMeasurements-r16   OPTIONAL,
    ...
}
```

FIG. 7A

```
NR-DL-TDOA-AdditionalMeasurements-r16 ::= SEQUENCE (SIZE (1..3)) OF
                                          NR-DL-TDOA-AdditionalMeasurementElement-r16

NR-DL-TDOA-AdditionalMeasurementElement-r16 ::= SEQUENCE {
  nr-DL-PRS-ResourceID-r16              NR-DL-PRS-ResourceID-r16              OPTIONAL,
  nr-DL-PRS-ResourceSetID-r16           NR-DL-PRS-ResourceSetID-r16           OPTIONAL,
  nr-TimeStamp-r16                      NR-TimeStamp-r16,
  nr-RSTD-ResultDiff-r16                CHOICE {
    k0-r16                                INTEGER (0..8191),
    k1-r16                                INTEGER (0..4095),
    k2-r16                                INTEGER (0..2047),
    k3-r16                                INTEGER (0..1023),
    k4-r16                                INTEGER (0..511),
    k5-r16                                INTEGER (0..255),
    ...
  },
  nr-TimingQuality-r16                  NR-TimingQuality-r16,
  nr-DL-PRS-RSRP-ResultDiff-r16         INTEGER (0..61)                       OPTIONAL,
  nr-AdditionalPathList-r16             NR-AdditionalPathList-r16             OPTIONAL,
  ...
}
```

*FIG. 7B*

```
DL-PRS-ID-Info-r16 ::= SEQUENCE {
    dl-PRS-ID-r16                    INTEGER (0..255),
    nr-DL-PRS-ResourceID-List-r16    SEQUENCE (SIZE (1..nrMaxResourceIDs-r16)) OF
                                       NR-DL-PRS-ResourceID-r16                   OPTIONAL,
    nr-DL-PRS-ResourceSetID-r16      NR-DL-PRS-ResourceSetID-r16                  OPTIONAL,
}
```

```
NR-DL-TDOA-SignalMeasurementInformation-r16 ::= SEQUENCE {
    dl-PRS-ReferenceInfo-r16              DL-PRS-ID-Info-r16,
    nr-DL-TDOA-MeasList-r16               NR-DL-TDOA-MeasList-r16,
    nr-DL-Ref_TDOA-MeasList-r17           nr-DL-Ref_TDOA-MeasList-r17,  ⎫910
    ...
}

NR-DL-TDOA-MeasList-r16 ::= SEQUENCE (SIZE(1..nrMaxTRPs-r16)) OF NR-DL-TDOA-MeasElement-r16

NR-DL-TDOA-MeasElement-r16 ::= SEQUENCE {
    nr-PhysCellID-r16                     NR-PhysCellID-r16 OPTIONAL,
    nr-DL-PRS-ResourceID-r16              NR-DL-PRS-ResourceID-r16 OPTIONAL,
    nr-DL-PRS-ResourceSetID-r16           NR-DL-PRS-ResourceSetID-r16 OPTIONAL,
    nr-RSTD-r16
    {...},
    Rx-TEG                                Rx_TEG_ID,
    Ref-RX-TEG                            RX_TEG_ID                  ⎫920 nr-DL-TDOA-AdditionalMeasurements-r16 NR-DL-TDOA-AdditionalMeasurements-r16
    ...
}

NR-DL-TDOA-AdditionalMeasurementElement-r16 ::= SEQUENCE {
    Ref-RX-TEG                            RX_TEG_ID                  ⎫930
}
```

FIG. 9

```
NR-DL-TDOA-SignalMeasurementInformation-r16 ::= SEQUENCE {
dl-PRS-ReferenceInfo-r16        DL-PRS-ID-Info-r16,
nr-DL-TDOA-MeasList-r16         NR-DL-TDOA-MeasList-r16,
nr-DL-TDOA-Ref-delta            NR-DL-TDOA-ref-deltaList-r16,
...
}

NR-DL-TDOA-ref-DeltaList ::= SEQUENCE {
RSTD-DeltaList                  Sequence of RSTD-Delta,
...
}

RSTD-Delta ::= SEQUENCE {
RSTD-Delta                      rstd-delta,
Rx-TEG                          Rx_TEG_ID,
...
}
```

FIG. 10

REFERENCE SIGNAL TIME DIFFERENCE (RSTD) MEASUREMENT REPORT ENHANCEMENTS FOR MULTI-TIMING ERROR GROUP (TEG) REQUESTS

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless positioning performed by a first network node includes receiving a measurement request from a location server, the measurement request requesting the first network node to measure a positioning reference signal (PRS) resource from at least one second network node using a plurality of receive timing error groups (Rx TEGs) of the first network node; and transmitting a measurement report to the location server, the measurement report including a plurality of positioning measurements based on the PRS resource, the plurality of positioning measurements corresponding to the plurality of Rx TEGs.

In an aspect, a first network node includes a memory; at least one transceiver; and at least one processor communicatively coupled to the memory and the at least one transceiver, the at least one processor configured to: receive, via the at least one transceiver, a measurement request from a location server, the measurement request requesting the first network node to measure a positioning reference signal (PRS) resource from at least one second network node using a plurality of receive timing error groups (Rx TEGs) of the first network node; and transmit, via the at least one transceiver, at least one measurement report to the location server, the at least one measurement report including a plurality of positioning measurements based on the PRS resource, the plurality of positioning measurements corresponding to the plurality of Rx TEGs.

In an aspect, a first network node includes means for receiving a measurement request from a location server, the measurement request requesting the first network node to measure a positioning reference signal (PRS) resource from at least one second network node using a plurality of receive timing error groups (Rx TEGs) of the first network node; and means for transmitting at least one measurement report to the location server, the at least one measurement report including a plurality of positioning measurements based on the PRS resource, the plurality of positioning measurements corresponding to the plurality of Rx TEGs.

In an aspect, a non-transitory computer-readable medium stores computer-executable instructions that, when executed by a first network node, cause the first network node to: receive a measurement request from a location server, the measurement request requesting the first network node to measure a positioning reference signal (PRS) resource from at least one second network node using a plurality of receive timing error groups (Rx TEGs) of the first network node; and transmit at least one measurement report to the location server, the at least one measurement report including a plurality of positioning measurements based on the PRS resource, the plurality of positioning measurements corresponding to the plurality of Rx TEGs.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 7A and 7B illustrate an example LPP measurement report for a TDOA positioning procedure, according to aspects of the disclosure.

FIG. 8 illustrates an example "DL-PRS-ID-Info" LPP information element (IE), according to aspects of the disclosure.

FIG. 9 illustrates an example "NR-DL-TDOA-SignalMeasurementInformation" LPP IE illustrating various options for reporting reference signal time difference (RSTD) measurements based on multiple receive timing error groups (Rx TEGs), according to aspects of the disclosure.

FIG. 10 illustrates an example "NR-DL-TDOA-SignalMeasurementInformation" LPP IE for reporting delta values, according to aspects of the disclosure.

DETAILED DESCRIPTION

Figure 1:
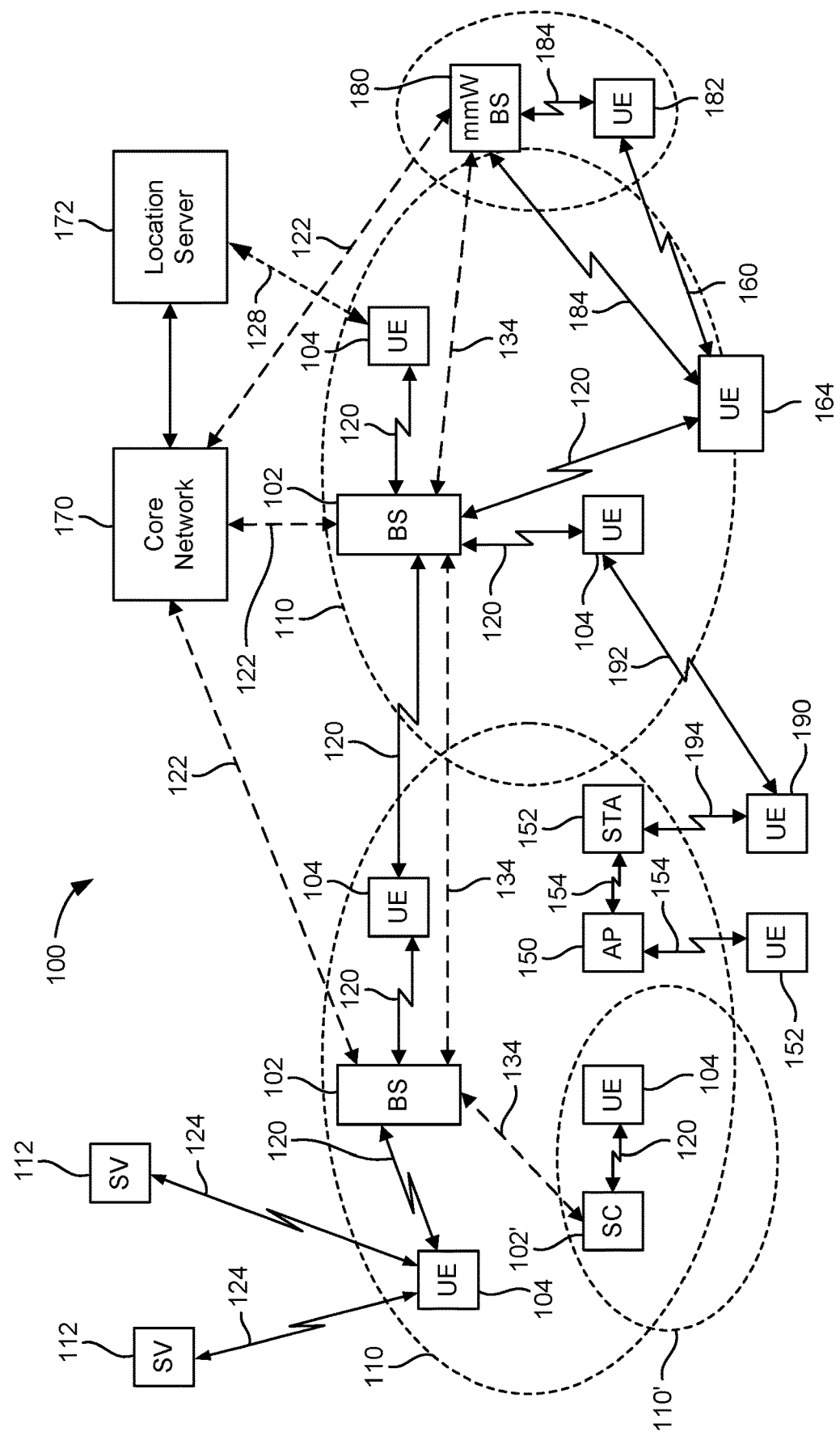
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
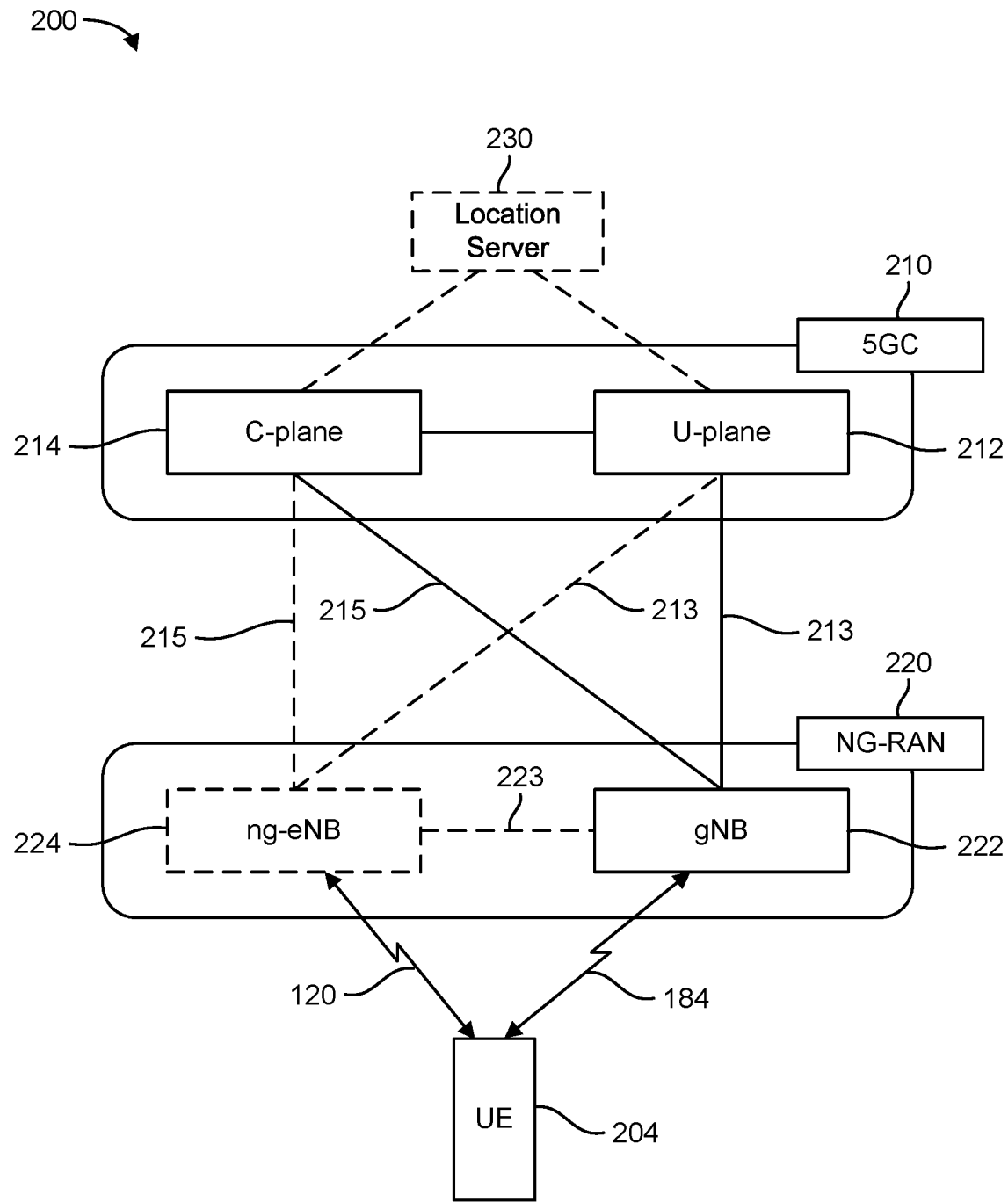
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
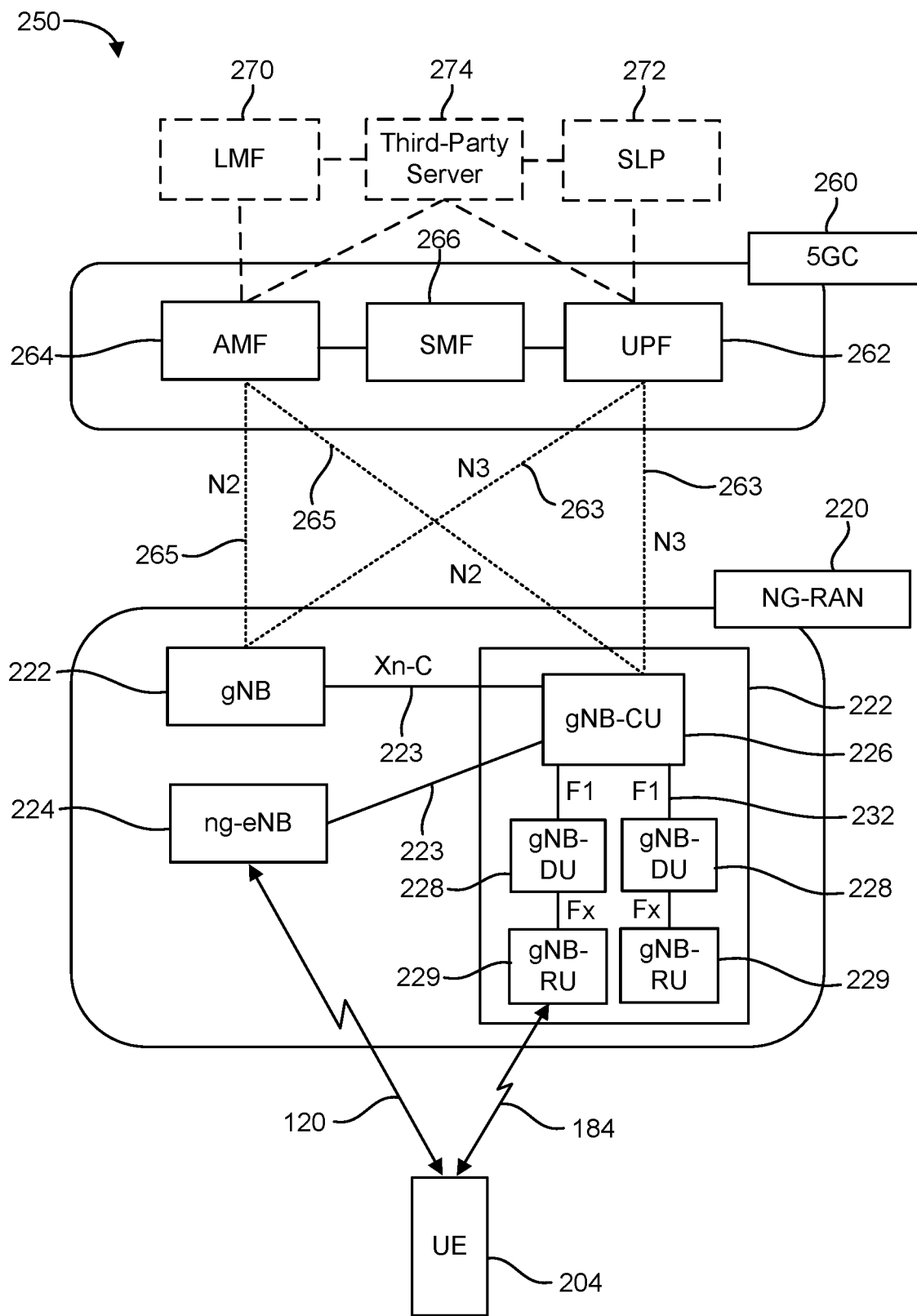

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
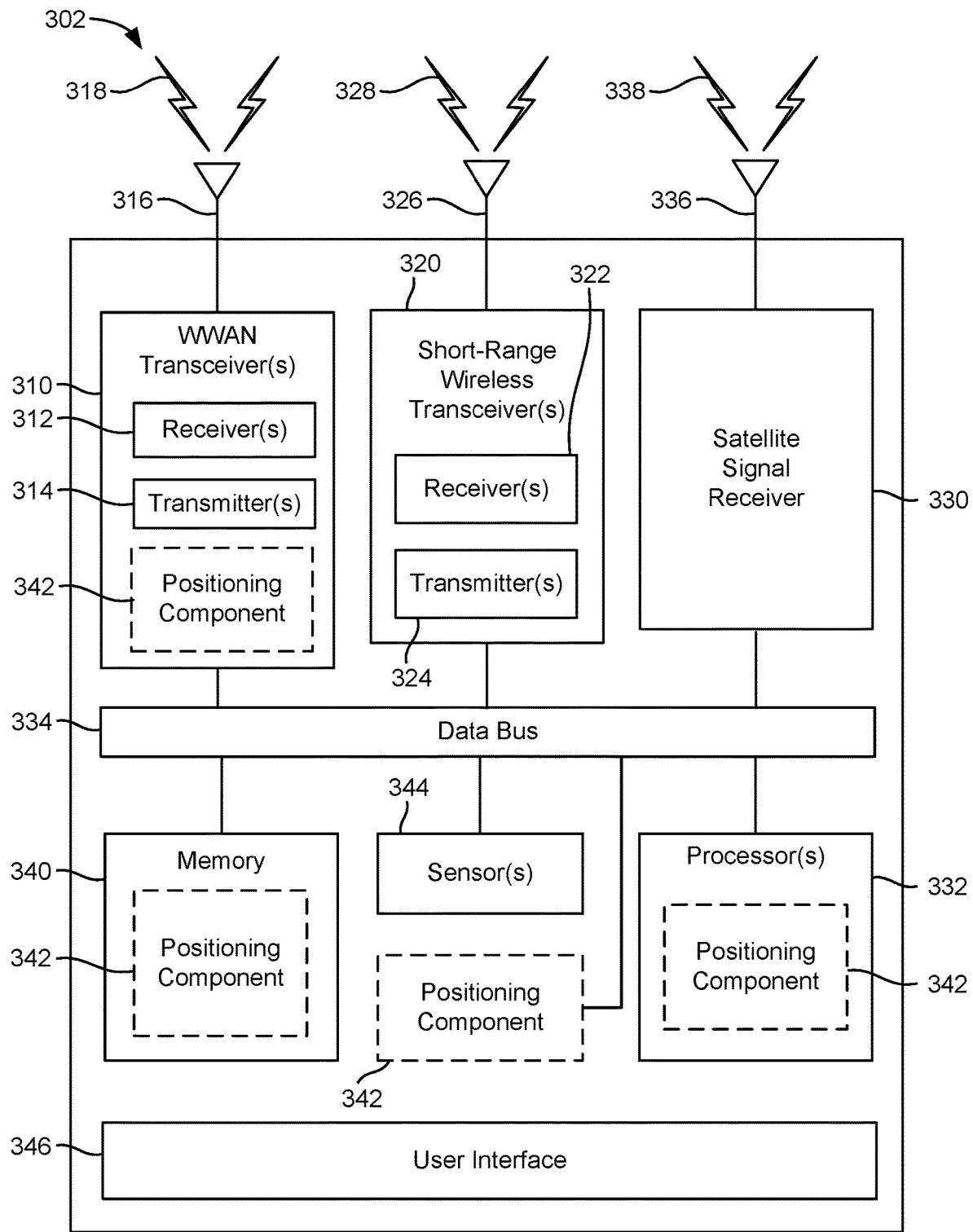
FIGS. 3A, 3B, and 3C are simplified block diagrams of several sample aspects of components that may be employed in a user equipment (UE), a base station, and a network entity, respectively, and configured to support communications as taught herein.
Figure 3B:
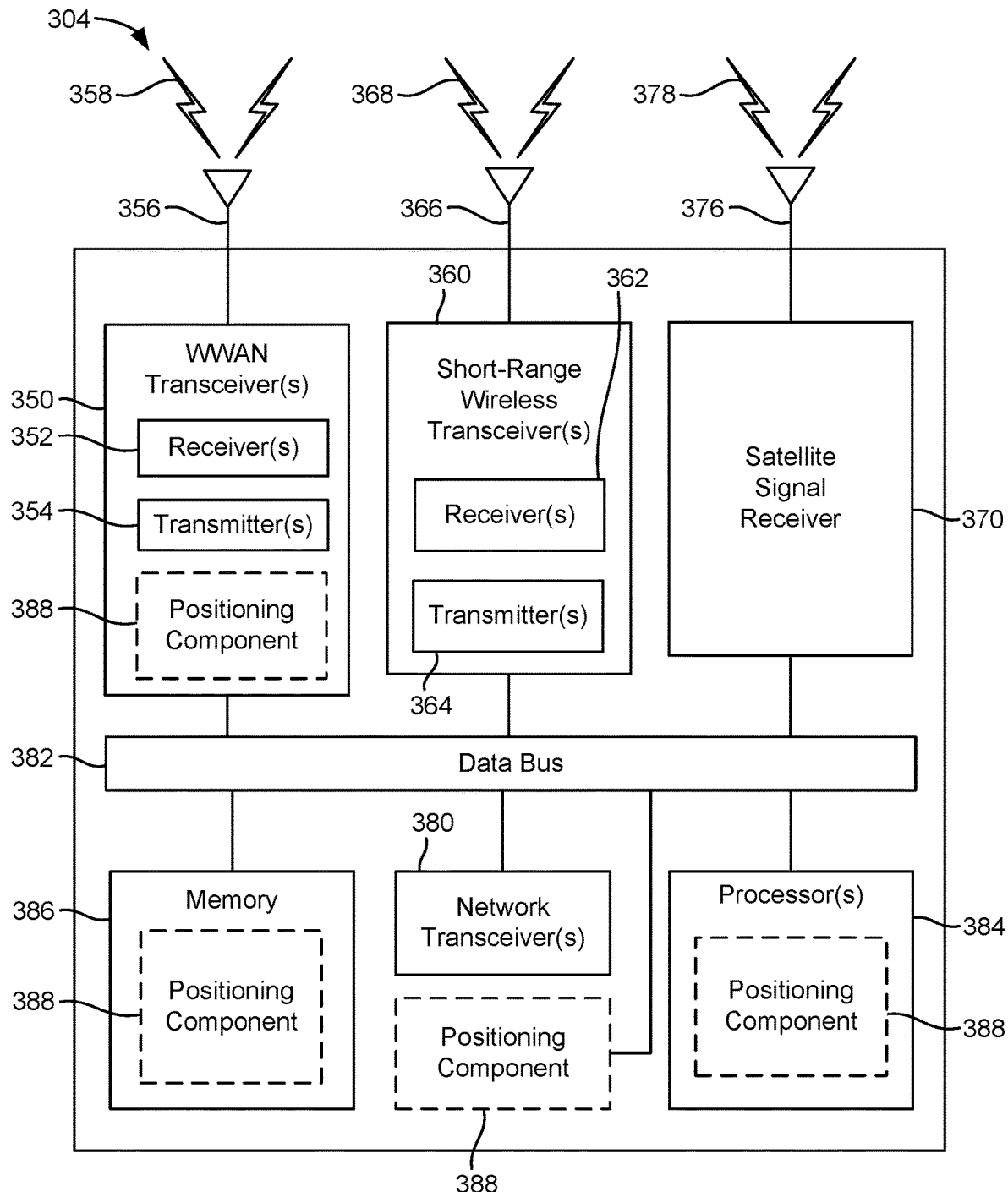
Figure 3C:
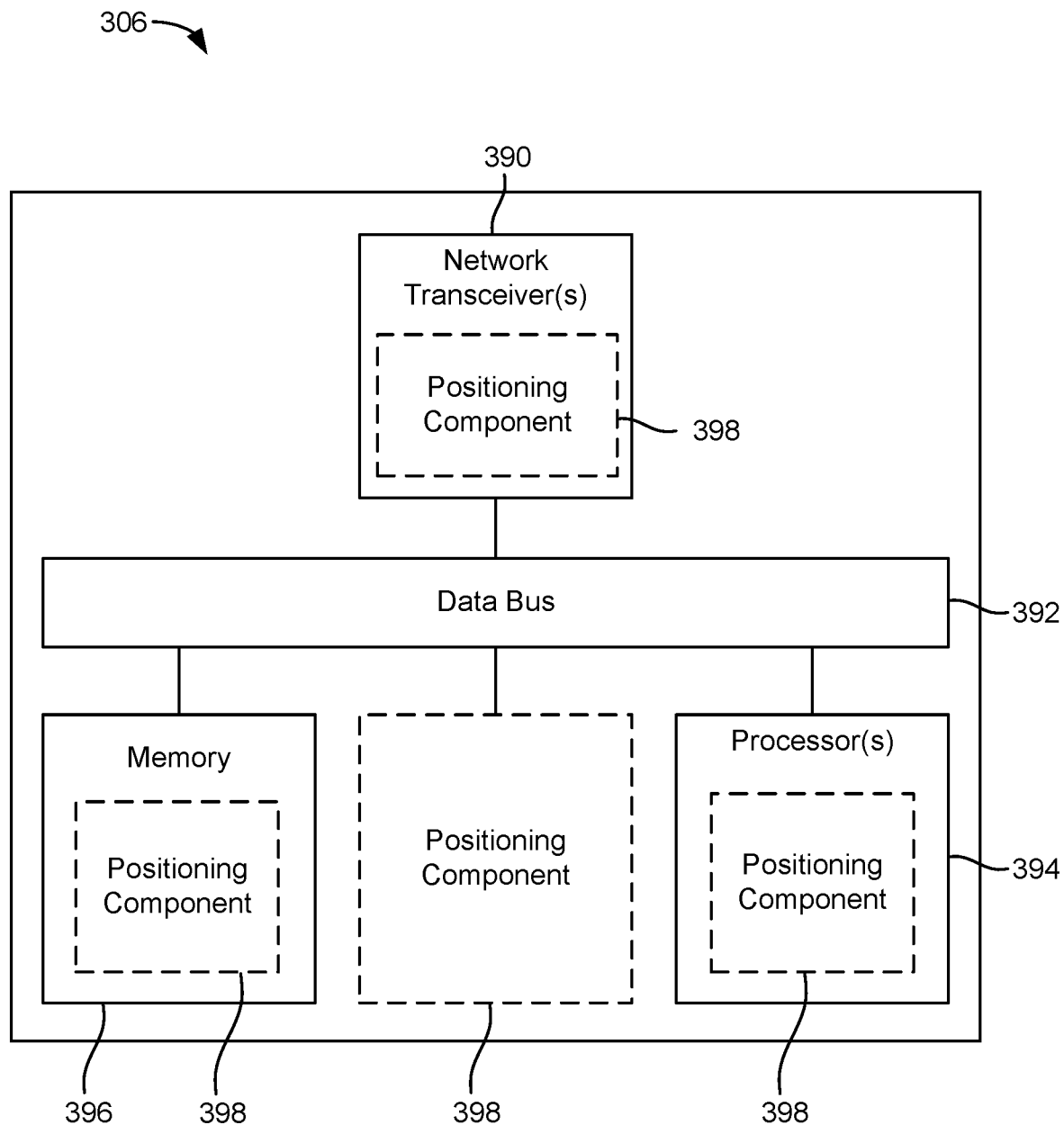

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/ frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver (s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
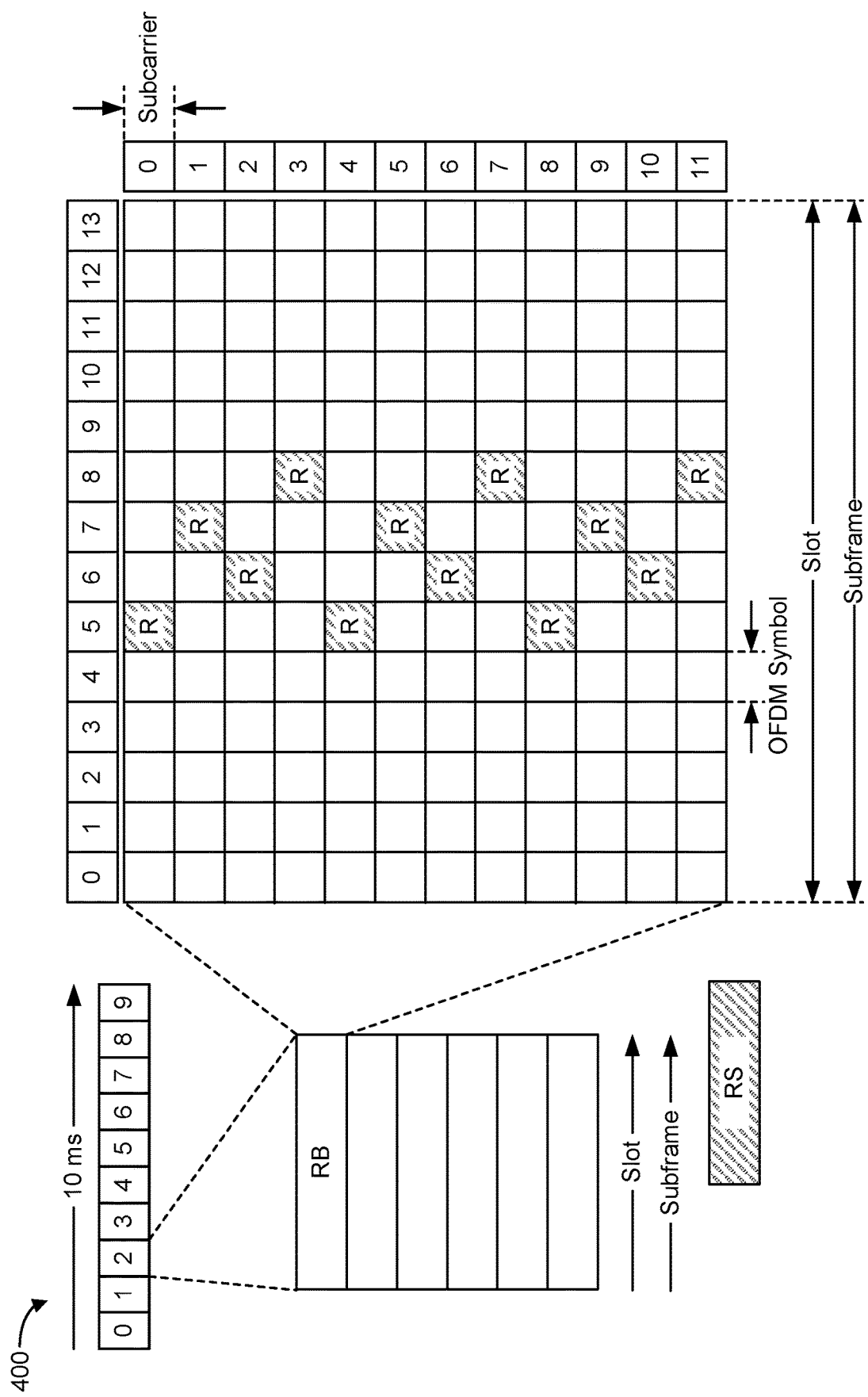
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (p), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds (µs), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 µs, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 Is, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 µs, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 µs, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: $\{0, 1\}$; 4-symbol comb-2: $\{0, 1, 0, 1\}$; 6-symbol comb-2: $\{0, 1, 0, 1, 0, 1\}$; 12-symbol comb-2: $\{0, 1, 0, 1, 0, 1, 0, 1, 0, 1, 0, 1\}$; 4-symbol comb-4: $\{0, 2, 1, 3\}$ (as in the example of FIG. 4); 12-symbol comb-4: $\{0, 2, 1, 3, 0, 2, 1, 3, 0, 2, 1, 3\}$; 6-symbol comb-6: $\{0, 3, 1, 4, 2, 5\}$; 12-symbol comb-6: $\{0, 3, 1, 4, 2, 5, 0, 3, 1, 4, 2, 5\}$; and 12-symbol comb-12: $\{0, 6, 3, 9, 1, 7, 4, 10, 2, 8, 5, 11\}$.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. The base stations then report the reception times (referred to as the relative time of arrival (RTOA)) of the reference signal (s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 5:
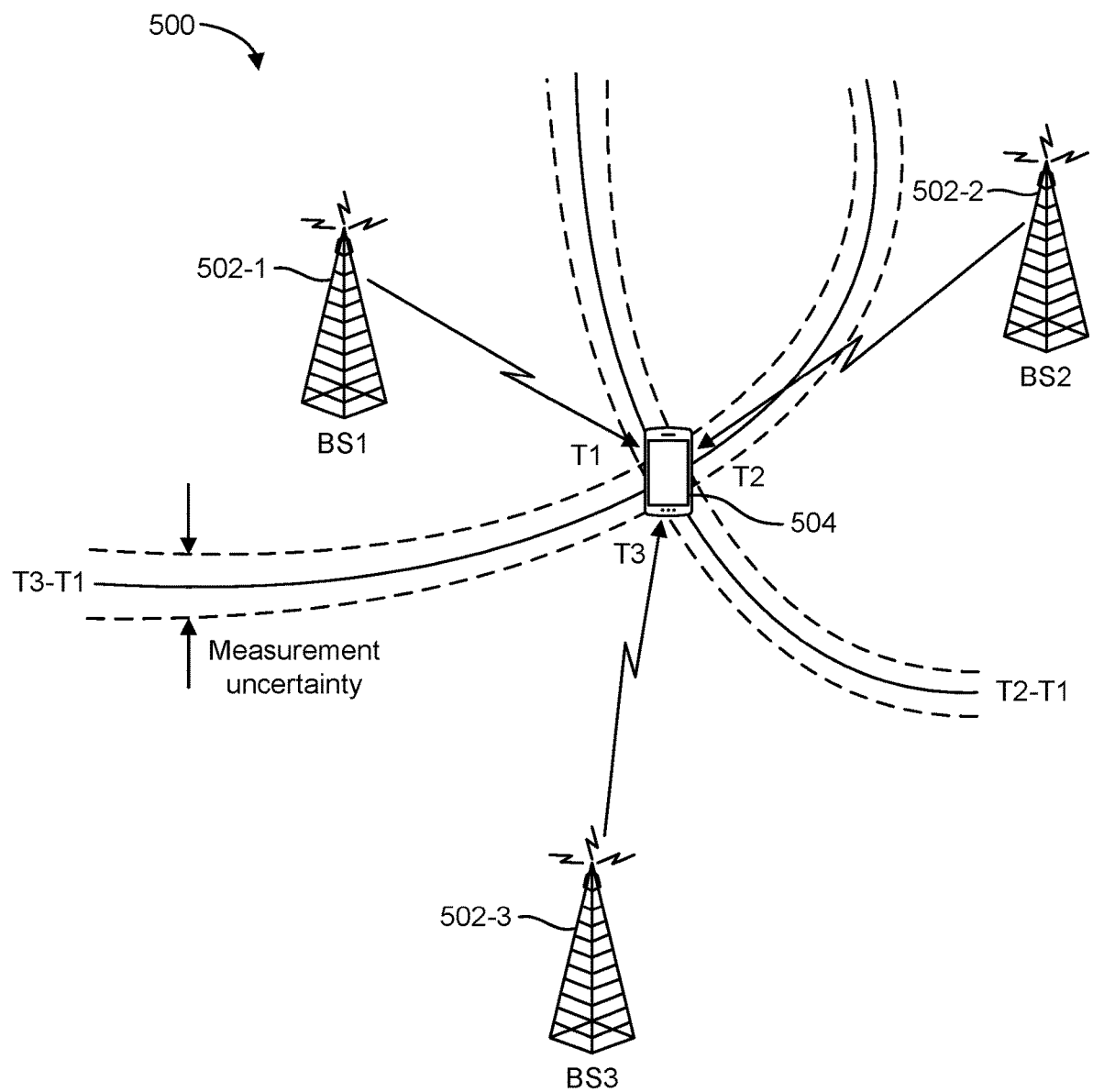
FIG. 5 illustrates a time difference of arrival (TDOA)-based positioning procedure in an example wireless communications system, according to aspects of the disclosure.

FIG. 5 illustrates a time difference of arrival (TDOA)-based positioning procedure in an example wireless communications system 500, according to aspects of the disclosure. The TDOA-based positioning procedure may be an observed time difference of arrival (OTDOA) positioning procedure, as in LTE, or a downlink time difference of arrival (DL-TDOA) positioning procedure, as in 5G NR. In the example of FIG. 5, a UE 504 (e.g., any of the UEs described herein) is attempting to calculate an estimate of its location (referred to as "UE-based" positioning), or assist another entity (e.g., a base station or core network component, another UE, a location server, a third party application, etc.) to calculate an estimate of its location (referred to as "UE-assisted" positioning). The UE 504 may communicate with (e.g., send information to and receive information from) one or more of a plurality of base stations 502 (e.g., any combination of base stations described herein), labeled "BS1" 502-1, "BS2" 502-2, and "BS3" 502-3.

To support location estimates, the base stations 502 may be configured to broadcast positioning reference signals (e.g., PRS, TRS, CRS, CSI-RS, etc.) to a UE 504 in their coverage areas to enable the UE 504 to measure characteristics of such reference signals. In a TDOA-based positioning procedure, the UE 504 measures the time difference, known as the reference signal time difference (RSTD) or TDOA, between specific downlink reference signals (e.g., PRS, TRS, CRS, CSI-RS, etc.) transmitted by different pairs of base stations 502, and either reports these RSTD measurements to a location server (e.g., location server 230, LMF 270, SLP 272) or computes a location estimate itself from the RSTD measurements.

Generally, RSTDs are measured between a reference cell (e.g., a cell supported by base station 502-1 in the example of FIG. 5) and one or more neighbor cells (e.g., cells supported by base stations 502-2 and 502-3 in the example of FIG. 5). The reference cell remains the same for all RSTDs measured by the UE 504 for any single positioning use of TDOA and would typically correspond to the serving cell for the UE 504 or another nearby cell with good signal strength at the UE 504. In an aspect, the neighbor cells would normally be cells supported by base stations different from the base station for the reference cell, and may have good or poor signal strength at the UE 504. The location computation can be based on the measured RSTDs and knowledge of the involved base stations' 502 locations and relative transmission timing (e.g., regarding whether base stations 502 are accurately synchronized or whether each base station 502 transmits with some known time offset relative to other base stations 502).

To assist TDOA-based positioning operations, the location server (e.g., location server 230, LMF 270, SLP 272) may provide assistance data to the UE 504 for the reference cell and the neighbor cells relative to the reference cell. For example, the assistance data may include identifiers (e.g., PCI, VCI, CGI, etc.) for each cell of a set of cells that the UE 504 is expected to measure (here, cells supported by the base stations 502). The assistance data may also provide the center channel frequency of each cell, various reference signal configuration parameters (e.g., the number of consecutive positioning slots, periodicity of positioning slots, muting sequence, frequency hopping sequence, reference signal identifier, reference signal bandwidth), and/or other cell related parameters applicable to TDOA-based positioning procedures. The assistance data may also indicate the serving cell for the UE 504 as the reference cell.

In some cases, the assistance data may also include "expected RSTD" parameters, which provide the UE 504 with information about the RSTD values the UE 504 is expected to measure between the reference cell and each neighbor cell at its current location, together with an uncertainty of the expected RSTD parameter. The expected RSTD, together with the associated uncertainty, may define a search window for the UE 504 within which the UE 504 is expected to measure the RSTD value. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

TDOA assistance information may also include positioning reference signal configuration information parameters, which allow the UE 504 to determine when a positioning reference signal occasion will occur on signals received from various neighbor cells relative to positioning reference signal occasions for the reference cell, and to determine the reference signal sequence transmitted from the various cells in order to measure a reference signal time of arrival (ToA) or RSTD.

In an aspect, while the location server (e.g., location server 230, LMF 270, SLP 272) may send the assistance data to the UE 504, alternatively, the assistance data can originate directly from the base stations 502 themselves (e.g., in periodically broadcasted overhead messages, etc.). Alternatively, the UE 504 can detect neighbor base stations itself without the use of assistance data.

The UE 504 (e.g., based in part on the assistance data, if provided) can measure and (optionally) report the RSTDs between reference signals received from pairs of base stations 502. Using the RSTD measurements, the known absolute or relative transmission timing of each base station 502, and the known location(s) of the reference and neighbor base stations 502, the network (e.g., location server 230/LMF 270/SLP 272, a base station 502) or the UE 504 can estimate the location of the UE 504. More particularly, the RSTD for a neighbor cell "k" relative to a reference cell "Ref" may be given as (ToA_k−ToA_Ref). In the example of FIG. 5, the measured RSTDs between the reference cell of base station 502-1 and the cells of neighbor base stations 502-2 and 502-3 may be represented as T2−T1 and T3−T1, where T1, T2, and T3 represent the ToA of a reference signal from the base station 502-1, 502-2, and 502-3, respectively. The UE 504 (if it is not the positioning entity) may then send the RSTD measurements to the location server or other positioning entity. Using (i) the RSTD measurements, (ii) the known absolute or relative transmission timing of each base station 502, (iii) the known location(s) of the base stations 502, and/or (iv) directional reference signal characteristics, such as the direction of transmission, the UE's 504 location may be determined (either by the UE 504 or the location server).

In an aspect, the location estimate may specify the location of the UE 504 in a two-dimensional (2D) coordinate system; however, the aspects disclosed herein are not so limited, and may also be applicable to determining location estimates using a three-dimensional (3D) coordinate system, if the extra dimension is desired. Additionally, while FIG. 5 illustrates one UE 504 and three base stations 502, as will be appreciated, there may be more UEs 504 and more base stations 502.

Still referring to FIG. 5, when the UE 504 obtains a location estimate using RSTDs, the necessary additional data (e.g., the base stations' 502 locations and relative transmission timing) may be provided to the UE 504 by the location server. In some implementations, a location estimate for the UE 504 may be obtained (e.g., by the UE 504 itself or by the location server) from RSTDs and from other measurements made by the UE 504 (e.g., measurements of signal timing from global positioning system (GPS) or other global navigation satellite system (GNSS) satellites). In these implementations, known as hybrid positioning, the RSTD measurements may contribute towards obtaining the UE's 504 location estimate but may not wholly determine the location estimate.

Figure 6:
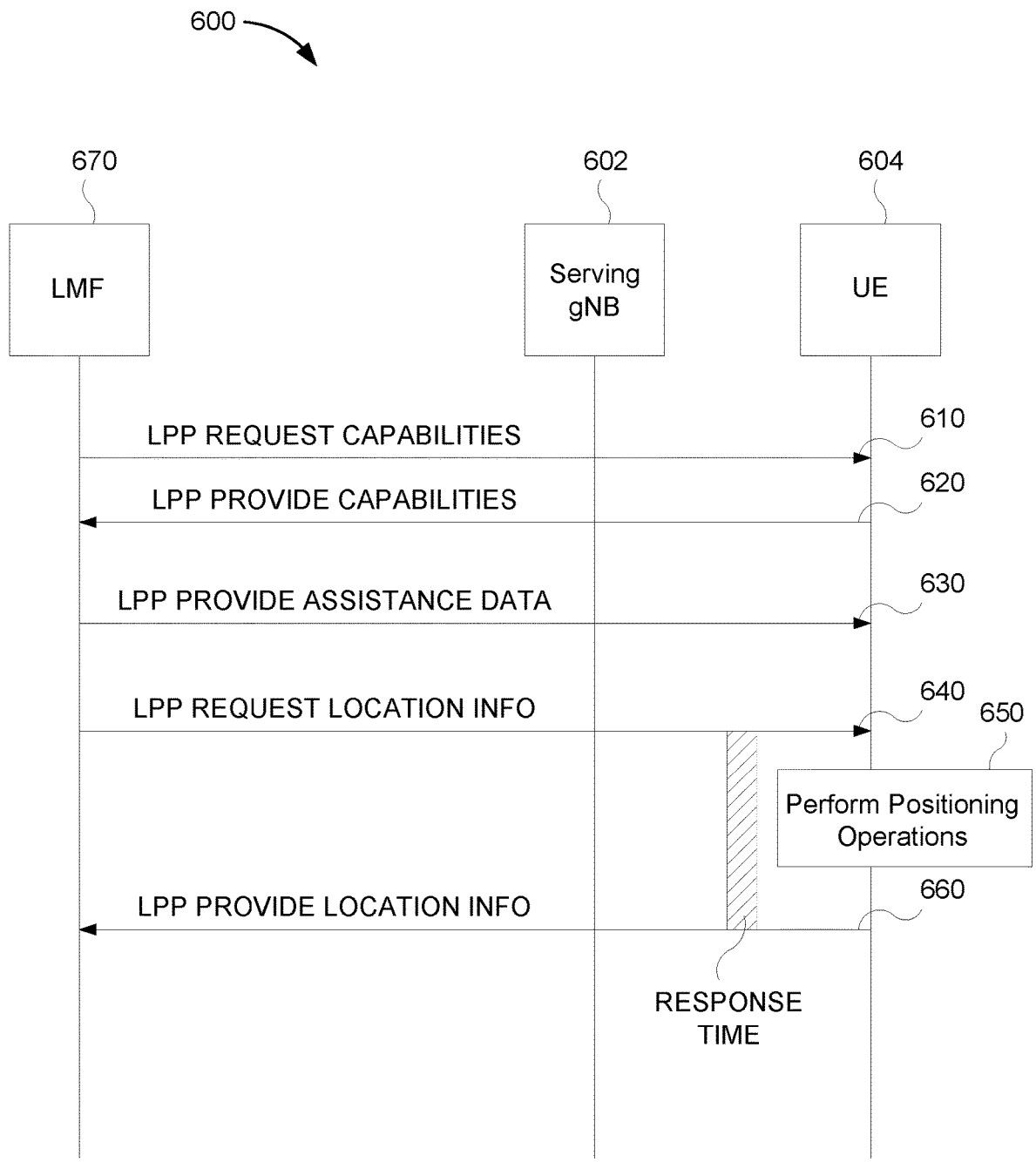
FIG. 6 illustrates an example Long-Term Evolution (LTE) positioning protocol (LPP) call flow between a UE and a location server for performing positioning operations.

FIG. 6 illustrates an example Long-Term Evolution (LTE) positioning protocol (LPP) procedure 600 between a UE 604 and a location server (illustrated as a location management function (LMF) 670) for performing positioning operations. As illustrated in FIG. 6, positioning of the UE 604 is supported via an exchange of LPP messages between the UE 604 and the LMF 670. The LPP messages may be exchanged between UE 604 and the LMF 670 via the UE's 604 serving base station (illustrated as a serving gNB 602) and a core network (not shown). The LPP procedure 600 may be used to position the UE 604 in order to support various location-related services, such as navigation for UE 604 (or for the user of UE 604), or for routing, or for provision of an accurate location to a public safety answering point (PSAP) in association with an emergency call from UE 604 to a PSAP, or for some other reason. The LPP procedure 600 may also be referred to as a positioning session, and there may be multiple positioning sessions for different types of positioning methods (e.g., downlink time difference of arrival (DL-TDOA), round-trip-time (RTT), enhanced cell identity (E-CID), etc.).

Initially, the UE 604 may receive a request for its positioning capabilities from the LMF 670 at stage 610 (e.g., an LPP Request Capabilities message). At stage 620, the UE 604 provides its positioning capabilities to the LMF 670 relative to the LPP protocol by sending an LPP Provide Capabilities message to LMF 670 indicating the position methods and features of these position methods that are supported by the UE 604 using LPP. The capabilities indicated in the LPP Provide Capabilities message may, in some aspects, indicate the type of positioning the UE 604 supports (e.g., DL-TDOA, RTT, E-CID, etc.) and may indicate the capabilities of the UE 604 to support those types of positioning.

Upon reception of the LPP Provide Capabilities message, at stage 620, the LMF 670 determines to use a particular type of positioning method (e.g., DL-TDOA, RTT, E-CID, etc.) based on the indicated type(s) of positioning the UE 604 supports and determines a set of one or more transmission-reception points (TRPs) from which the UE 604 is to measure downlink positioning reference signals or towards which the UE 604 is to transmit uplink positioning reference signals. At stage 630, the LMF 670 sends an LPP Provide Assistance Data message to the UE 604 identifying the set of TRPs.

In some implementations, the LPP Provide Assistance Data message at stage 630 may be sent by the LMF 670 to the UE 604 in response to an LPP Request Assistance Data message sent by the UE 604 to the LMF 670 (not shown in FIG. 6). An LPP Request Assistance Data message may include an identifier of the UE's 604 serving TRP and a request for the positioning reference signal (PRS) configuration of neighboring TRPs.

At stage 640, the LMF 670 sends a request for location information to the UE 604. The request may be an LPP Request Location Information message. This message usually includes information elements defining the location information type, desired accuracy of the location estimate, and response time (i.e., desired latency). Note that a low latency requirement allows for a longer response time while a high latency requirement requires a shorter response time. However, a long response time is referred to as high latency and a short response time is referred to as low latency.

Note that in some implementations, the LPP Provide Assistance Data message sent at stage 630 may be sent after the LPP Request Location Information message at 640 if, for example, the UE 604 sends a request for assistance data to LMF 670 (e.g., in an LPP Request Assistance Data message, not shown in FIG. 6) after receiving the request for location information at stage 640.

At stage 650, the UE 604 utilizes the assistance information received at stage 630 and any additional data (e.g., a desired location accuracy or a maximum response time) received at stage 640 to perform positioning operations (e.g., measurements of DL-PRS, transmission of UL-PRS, etc.) for the selected positioning method.

At stage 660, the UE 604 may send an LPP Provide Location Information message to the LMF 670 conveying the results of any measurements that were obtained at stage 650 (e.g., time of arrival (ToA), reference signal time difference (RSTD), reception-to-transmission (Rx-Tx), etc.) and before or when any maximum response time has expired (e.g., a maximum response time provided by the LMF 670 at stage 640). The LPP Provide Location Information message at stage 660 may also include the time (or times) at which the positioning measurements were obtained and the identity of the TRP(s) from which the positioning measurements were obtained. Note that the time between the request for location information at 640 and the response at 660 is the "response time" and indicates the latency of the positioning session.

The LMF 670 computes an estimated location of the UE 604 using the appropriate positioning techniques (e.g., DL-TDOA, RTT, E-CID, etc.) based, at least in part, on measurements received in the LPP Provide Location Information message at stage 660.

FIGS. 7A and 7B illustrate an example LPP measurement report 700 for a DL-TDOA positioning procedure, according to aspects of the disclosure. Specifically, the LPP measurement report 700 is an "NR-DL-TDOA-SignalMeasurementInformation" LPP information element (IE) that may be used in an LPP Provide Location Information message, as at stage 660. An "NR-DL-TDOA-SignalMeasurementInformation" IE is used by the target device (e.g., a UE being positioned) to provide DL-TDOA measurements to the location server (e.g., LMF 270).

Note that the "dl-PRS-ReferenceInfo" field defines the "RSTD reference" TRP (e.g., the reference cell of base station 602-1). The "nr-RSTD" and "nr-RSTD-ResultDiff" fields in the "nr-DL-TDOA-MeasList" IE are provided relative to the "RSTD reference" TRP. Also note that the "RSTD reference" TRP may or may not be the same as the "assistance data reference" TRP provided by the "nr-DL-PRS-ReferenceInfo" field in an "NR-DL-PRS-AssistanceData" LPP IE (e.g., used for an LPP Provide Assistance Data message as at stage 630).

The following table describes various fields of an "NR-DL-TDOA-SignalMeasurementInformation" IE.

TABLE 1

"NR-DL-TDOA-SignalMeasurementInformation" Field Descriptions

"dl-PRS-ID"
This field is used along with a DL-PRS Resource Set ID and a DL-PRS Resources ID
to uniquely identify a DL-PRS Resource. This ID can be associated with multiple DL-
PRS Resource Sets associated with a single TRP.
Each TRP should only be associated with one such ID.
"nr-PhysCellID"
This field specifies the physical cell identity of the associated TRP.
"nr-CellGlobalID"
This field specifies the NR CGI (NCGI), the globally unique identity of a cell in NR, of
the associated TRP.
"nr-ARFCN"
This field specifies the NR-ARFCN of the TRP's cell-defining SSB (CD-SSB)
corresponding to "nr-PhysCellID."
"nr-TimeStamp"
This field specifies the time instance at which the ToA and DL PRS-RSRP (if included)
measurement is performed. The "nr-SFN" and "nr-Slot" fields in the "NR-TimeStamp"
IE correspond to the TRP provided in "dl-PRS-ReferenceInfo." Note, the ToA
measurement refers to the ToA of this neighbor TRP or the reference TRP, as
applicable, used to determine the "nr-RSTD" or "nr-RSTD-ResultDiff."
"nr-RSTD"
This field specifies the relative timing difference between this neighbor TRP and the
PRS reference TRP.
"nr-AdditionalPathList"
This field specifies one or more additional detected path timing values for the TRP or
PRS resource, relative to the path timing used for determining the "nr-RSTD" value. If
this field was requested but is not included, it means the UE did not detect any additional
path timing values.
"nr-TimingQuality"
This field specifies the target device's best estimate of the quality of the ToA
measurement. Note, the ToA measurement refers to the ToA of this neighbor TRP or
the reference TRP, as applicable, used to determine the "nr-RSTD" or "nr-RSTD-
ResultDiff."
"nr-DL-PRS-RSRP-Result"
This field specifies the NR DL-PRS reference signal received power (DL PRS-RSRP)
measurement.
"nr-RSTD-ResultDiff"
This field provides the additional DL RSTD measurement result relative to "nr-RSTD."
The RSTD value of this measurement is obtained by adding the value of this field to the
value of the "nr-RSTD" field.
"nr-DL-PRS-RSRP-ResultDiff"
This field provides the additional DL-PRS RSRP measurement result relative to "nr-
DL-PRS-RSRP-Result." The DL-PRS RSRP value of this measurement is obtained by
adding the value of this field to the value of the "nr-DL-PRS-RSRP-Result" field.

FIG. 8 illustrates an example "DL-PRS-ID-Info" LPP IE 800, according to aspects of the disclosure. As shown in FIG. 7A, the "dl-PRS-ReferenceInfo" field of the "NR-DL-TDOA-SignalMeasurementInformation" IE points to a "DL-PRS-ID-Info" LPP IE 800. The "DL-PRS-ID-Info" LPP IE 800 provides the identifiers of the reference TRPs' DL-PRS resources. The following table describes various fields of a "DL-PRS-ID-Info" LPP IE 800.

TABLE 2

"DL-PRS-ID-Info" Field Descriptions

"nr-DL-PRS-ResourceID-List"
This field provides a list of DL-PRS Resource IDs under the same DL-PRS Resource
Set.

A UE is expected to report one or more measurement instances (of RSTD, downlink RSRP, and/or UE Rx-Tx time difference measurements) in a single measurement report (e.g., in the LPP Provide Location Information message at stage 660) to the location server for UE-assisted positioning (there is no such reporting for UE-based positioning). Each UE measurement instance can be configured with 'N' (including N=1) instances of a DL-PRS resource set. Similarly, a TRP is expected to report one or more measurement instances (of relative ToA (RTOA), uplink RSRP, and/or base station Rx-Tx time difference measurements) in a single measurement report to the location server (e.g., via NR positioning protocol type A (NRPPa)). Each measurement instance is reported with its own timestamp, and the measurement instances may be within a (configured) measurement window having a duration of one measurement period (as defined in 3GPP Technical Specification (TS) 38.133, which is publicly available and incorporated by reference herein in its entirety). Each TRP measurement instance can be configured with 'M' (including M=1) SRS measurement time occasions. Note that a measurement instance refers to one or more measurements, which can either be the same or different types, and which are obtained from the same DL-PRS resource(s) or the same SRS resource(s).

Each measurement instance is also reported with its own timing error to enable the positioning entity to compensate for the timing error, or to determine an uncertainty based on the timing error. The following definitions are used for the purpose of describing internal timing errors:

Transmit (Tx) timing error: From a signal transmission perspective, there is a time delay from the time when the digital signal is generated at the baseband to the time when the RF signal is transmitted from the transmit antenna. For supporting positioning, the UE/TRP may implement an internal calibration/compensation of the transmit time delay for the transmission of the DL-PRS/UL-SRS, which may also include the calibration/compensation of the relative time delay between different RF chains in the same UE/TRP. The compensation may also consider the offset of the transmit antenna phase center to the physical antenna center. However, the calibration may not be perfect. The remaining transmit time delay after the calibration, or the uncalibrated transmit time delay is defined as the "transmit timing error" or "Tx timing error."

Receive (Rx) timing error: From a signal reception perspective, there is a time delay from the time when the RF signal arrives at the Rx antenna to the time when the signal is digitized and time-stamped at the baseband. For supporting positioning, the UE/TRP may implement an internal calibration/compensation of the Rx time delay before it reports the measurements that are obtained from the DL-PRS/SRS, which may also include the calibration/compensation of the relative time delay between different RF chains in the same UE/TRP. The compensation may also consider the offset of the Rx antenna phase center to the physical antenna center. However, the calibration may not be perfect. The remaining Rx time delay after the calibration, or the uncalibrated Rx time delay, is defined as the "Rx timing error."

UE Tx timing error group (TEG): A UE Tx TEG (or TxTEG) is associated with the transmissions of one or more SRS resources for the positioning purpose, which have the Tx timing errors within a certain margin (e.g., within a threshold of each other).

TRP Tx TEG: A TRP Tx TEG (or TxTEG) is associated with the transmissions of one or more DL-PRS resources, which have the Tx timing errors within a certain margin.

UE Rx TEG: A UE Rx TEG (or RxTEG) is associated with one or more downlink measurements, which have the Rx timing errors within a certain margin.

TRP Rx TEG: A TRP Rx TEG (or RxTEG) is associated with one or more uplink measurements, which have the Rx timing errors within a margin.

UE Rx-Tx TEG: A UE Rx-Tx TEG (or RxTxTEG) is associated with one or more UE Rx-Tx time difference measurements, and one or more SRS resources for the positioning purpose, which have the Rx timing errors plus Tx timing errors within a certain margin.

TRP Rx-Tx TEG: A TRP Rx-Tx TEG (or RxTxTEG) is associated with one or more TRP Rx-Tx time difference measurements and one or more DL-PRS resources, which have the Rx timing errors plus Tx timing errors within a certain margin.

Subject to a UE's capabilities (e.g., as reported at stage 620), it has been proposed that the location server be able to request a UE to optionally measure the same DL-PRS resource of a TRP with K different UE Rx TEGs and report the corresponding multiple RSTD measurements. The UE may be capable of a total of N Rx TEGs, where N may be less than, equal to, or greater than K. The values of K and N may be, for example, selected from the set of {2, 3, 4}, or may be some other values, where the maximum value of N depends on the UE's capabilities. It has not been discussed whether the TRP to be measured can be an RSTD reference TRP or a neighbor TRP or both. The specific signaling for requesting and receiving measurements associated with multiple Rx TEGs has also not been discussed.

An issue with reporting multiple Rx TEGs is that the number of measurements to report if the multiple Rx TEGs are to be reported for the reference TRP is significantly more than if the multiple Rx TEGs are to be reported for a neighbor TRP. For example, given a neighbor TRP (denoted "TRP_i") and a reference TRP (denoted "ref_TRP"), the RSTD measurement for the neighbor TRP (denoted "RSTD_i") is the ToA of the PRS from the ref_TRP (denoted "ref_TRP_TOA") minus the ToA of the PRS from TRP_i (denoted "TRP_i_TOA"). That is, RSTD_i=ref_TRP_TOA−TRP_i_TOA. If the reference TRP's ToA (ref_TRP_TOA) changes due to being associated with a different Rx TEG, then, according to the current standards, the ULE needs to re-report all the RSTD_i's of all the neighbor TRPs. For example, for M neighbor TRPs, to report N Rx TEGs for the reference TRP, the UE would need to report N*(M−1) RSTD measurements.

Because only ref_TRP_ToA changes for different Rx TEGs, in various aspects, the UE can "compress" the measurement report to include only (M−1)+(N−1) RSTD measurements, rather than N*(M−1) RSTD measurements. For example, the UE can report only a subset of RSTD measurements, or report only the timing differences (or deltas) between the RSTD measurements associated with the different Rx TEGs. After the location server receives the measurement report, it can use the deltas to recover all N*(M−1) RSTD measurement using the (M−1)+(N−1) RSTD measurements.

As a first technique, the current standards allow the location server to request a UE to measure a specific PRS resource of a specific TRP (e.g., in an LPP Request Location Information message as at stage 640). There is currently no TEG requirement in a measurement request. Although it has been proposed that the location server may request a UE to measure the same DL-PRS resource with N different Rx TEGs, there is no signaling to indicate such a measurement request. Accordingly, in various aspects, when the location server requests a UE to measure the same PRS resource with N Rx TEGs, the measurement request (e.g., an LPP Request Location Information message as at stage 640) may include a list of required Rx TEG identifiers and/or the number of Rx TEGs. This information may be based on the UE's reported Rx TEG information. The request may also include identifiers of the TRP(s) to be measured, as well as identifiers of the PRS resources to be measured. Note that the reference TRP is selected by the UE, although the location server may suggest one TRP as the reference.

A second technique described herein relates to a UE including RSTD measurements associated with multiple Rx TEGs in a measurement report (e.g., an LPP Provide Location Information message as at stage 660). In the following description, the parameter $$RSTD_{i,0}^{TEG_i^{x(i)},TEG_o^y}$$

represents an RSTD measurement. The subscript "i,0" indicates that the RSTD is calculated between a neighbor TRP "i" (where i=1, 2, . . . M−1 and M is the number of TRPs) and a reference TRP "0." In the superscript, the parameter $TEG_i^{x(i)}$ indicates that the ToA associated with TRP i is measured with Rx TEG x. The parameter $TEG_0^y$ indicates that the ToA associated with the reference TRP is measured with Rx TEG y. The Rx TEG used to measure the reference TRP is referred to as the reference Rx TEG.

In a first scenario (denoted "Case 1"), the location server requests the UE to optionally measure the same DL-PRS resource of one TRP with N different UE Rx TEGs. As a first sub-scenario (denoted "Case 1-1"), if the TRP is a neighbor TRP; (where i is greater than zero), the UE can reuse the current RSTD measurement report, with additional information about the Rx TEGs in each measurement. More specifically, the current agreement is that, subject to UE capability, a UE may include one Rx TEG ID for the RSTD reference time (e.g., ref_RSTD_TOA) and one Rx TEG ID for each RSTD measurement (including each additional RSTD measurement) in a DL-TDOA measurement report. These Rx TEG IDs can be the same or different. Thus, in this case, the UE would report N RSTD measurements with N Rx TEG IDs for the identified neighbor TRP. This can be denoted by the set of RSTD measurements $$\left[ RSTD_{i,0}^{TEG_i^1, TEG_o^y} \quad \ldots \quad RSTD_{i,0}^{TEG_i^N, TEG_o^y} \right].$$

In a second sub-scenario (denoted "Case 1-2"), if the identified TRP is the reference TRP, there are two options. As a first option (denoted "Option 1"), the UE can again reuse the current RSTD measurement report. That is, the UE would report all the RSTD combinations with the associated TEG information. This can be denoted by the set of measurements $$\left[ \left[ RSTD_{1,0}^{TEG_1^{x(1)}, TEG_o^1} \quad \ldots \quad RSTD_{M-1,0}^{TEG_{M-1}^{x(M-1)}, TEG_o^1} \right], \right.$$
$$\left. \ldots, \left[ RSTD_{1,0}^{TEG_1^{x(1)}, TEG_o^N} \quad \ldots \quad RSTD_{M-1,0}^{TEG_{M-1}^{x(M-1)}, TEG_o^N} \right] \right].$$

In this case, the total number of measurements reported would be N*(M−1).

As a second option (denoted "Option 2"), the UE can report a list of (N−1) additional measurements. There are two sub-options. As a first sub-option (denoted "Option 2-1"), the UE can report M−1 RSTD measurements for the neighboring TRPs 1 to M−1 using Rx TEG x, and N−1 additional RSTD measurements for one of the neighboring TRPs (e.g., TRP$_1$) using the N Rx TEGs for the reference TRP. This set of measurements may be denoted $$\left[ \left[ RSTD_{1,0}^{TEG_1^{x(1)}, TEG_o^1} \quad \ldots \quad RSTD_{M-1,0}^{TEG_{M-1}^{x(M-1)}, TEG_o^1} \right], \left[ RSTD_{1,0}^{TEG_1^{x(1)}, TEG_o^2} \quad \ldots \quad RSTD_{M-1,0}^{TEG_{M-1}^{x(M-1)}, TEG_o^N} \right] \right].$$

Here, neighbor TRP$_1$ (indicated by the "1" in the TEG superscripts above) is selected merely as an example for the extra measurement report; the UE may select any neighbor TRP 1 to M−1 for the extra report. Similarly, Rx TEG$_1$ (indicated by the "1" in the superscript TEG$_o^1$) is selected merely as an example; the default Rx TEG for the reference TRP is up to UE implementation.

In this sub-option, the total number of measurements reported is (M−1)+(N−1). For any neighbor TRP$_i$, the $$RSTD_{i,0}^{TEG_i^{x(i)}, TEG_o^y}$$

can then be calculated as:

$$RSTD_{i,0}^{TEG_i^{x(i)}, TEG_o^y} =$$
$$RSTD_{1,0}^{TEG_1^{x(1)}, TEG_o^y} - RSTD_{1,0}^{TEG_1^{x(1)}, TEG_o^1} + RSTD_{i,0}^{TEG_i^{x(i)}, TEG_o^1}$$

As a second sub-option (denoted "Option 2-2"), the UE can report M−1 RSTD measurements for the neighboring TRPs 1 to M−1 using Rx TEG x, and N−1 delta measurements. This set of measurements may be denoted $$\left[ RSTD_{1,0}^{TEG_1^{x(1)}, TEG_o^1} \quad \ldots \quad RSTD_{M-1,0}^{TEG_{M-1}^{x(M-1)}, TEG_o^1} \right],$$
$$\left[ \text{Delta}^{TEG_0^2, TEG_o^1}, \ldots, \text{Delta}^{TEG_0^N, TEG_o^1} \right].$$

In this case, the total number of measurements reported is again (M−1)+(N−1). Instead or reporting N−1 additional RSTD measurements, however, the UE may directly report the timing delta (or difference) caused by different Rx TEGs. Each delta may be calculated as:

$$\text{Delta}^{TEG_0^2, TEG_o^y} = RSTD_{1,0}^{TEG_1^{x(1)}, TEG_o^y} - RSTD_{1,0}^{TEG_1^{x(1)}, TEG_o^1}$$

A special case for the second option (i.e., "Option 2") is that the UE only reports N−1 measurements (either in the format of an RSTD measurement or a delta value) when the UE either (1) reuses ToA measurements of neighbor TRPs from previous occasions and/or (2) experiences little to no movement (e.g., as indicated by other sensors, such as an inertial measurement unit (IMU)). In this case, there is no need to report the set of RSTD measurements $$\left[ RSTD_{1,0}^{TEG_1^{x(1)}, TEG_o^1} \quad \ldots \quad RSTD_{M-1,0}^{TEG_{M-1}^{x(M-1)}, TEG_o^1} \right]$$

again.

A third technique described herein relates to the IE design to report the measurements for Option 2-1 and Option 2-2 above. For Option 2-1, for the N−1 measurements, there are various options. FIG. 9 illustrates an example "NR-DL-TDOA-SignalMeasurementInformation" LPP IE 900 illustrating various options for reporting RSTD measurements based on multiple Rx TEGs according to Option 2-1.

As noted above, subject to UE capability, a UE may include one Rx TEG ID for the RSTD reference time (e.g., ref_RSTD_TOA) and one Rx TEG ID for each RSTD measurement (including each additional RSTD measurement) in a DL-TDOA measurement report. These Rx TEG IDs can be the same or different. Note that the Rx TEG ID for the RSTD reference time is optional—it is needed if the reference Rx TEG is different than the default reference Rx TEG. The default reference Rx TEG is reported as Rx TEG ID in one of the RSTD measurements. This RSTD has a value equal to 0, meaning that Ref_TRP_ToA−Ref_TRP_ToA=0 (this is a special case of an RSTD for the same cell/TRP). This RSTD is used to indicate the ref_TRP selection in the DL-TDOA measurement report.

As a first option, denoted by box 910, the UE can report a list of TDOA measurements (denoted "nr-DL-Ref_TDOA-MeasList") that contains the additional RSTD measurements. The "nr-DL-Ref_TDOA-MeasList" IE may be similar to the currently-defined "nr-DL-TDOA-MeasList" IE), but would be used to report the (M−1)+(N−1) measurements. Each RSTD measurement would further indicate the reference TRP's Rx TEG.

As a second option, denoted by box 920, two Rx TEG IDs could be defined in an "NR-DL-TDOA-MeasElement" IE. One (e.g., the first) would be the neighbor TRP's Rx TEG ID and another (e.g., the second) would be the reference TRP's Rx TEG IDs. In various aspects, the reference TRP's Rx TEG IDs could overwrite the default Rx TEG ID for the RSTD reference time. That is, the reference TRP's Rx TEG ID may not be the default reference TRP's Rx TEG ID.

As a third option, denoted by box 930, in the "NR-DL-TDOA-MeasElement" IE of one neighbor TRP, N−1 "NR-DL-TDOA-AdditionalMeasurementElement" IEs could be provided, with a reference TRP Rx TEG ID (denoted by a "Ref-Rx-TEG" field having a value of "RX_TEG_ID") in each additional RSTD measurement. Again, in various aspects, the reference TRP's Rx TEG IDs could overwrite the default Rx TEG ID for the RSTD reference time. That is, the reference TRP's Rx TEG ID may not be the default reference TRP's Rx TEG ID.

Referring now to Option 2-2, FIG. 10 illustrates an example "NR-DL-TDOA-SignalMeasurementInformation" LPP IE 1000 for reporting delta values, according to aspects of the disclosure. As shown, the "NR-DL-TDOA-SignalMeasurementInformation" LPP IE 1000 includes an "NR-DL-TDOA-ref-DeltaList" field that includes a sequence of "RSTD-DeltaList" fields that point to a sequence of "RSTD-Delta" IEs. Each RSTD-Delta IE includes a sequence of RSTD-Delta fields and Rx-TEG fields (the same Rx-TEG field as in FIG. 9). The RSTD-Delta field indicates the actual delta value being reported, denoted "rstd-delta," and the Rx-TEG field indicates the associated Rx TEG ID (denoted "RX_TEG_ID").

In various aspects, a UE may report N DL-TDOA measurement reports for a reference TRP using other Rx TEGs and for the reference TRP using the default Rx TEG. In this case, one of the DL-TDOA measurement reports has an RSTD measurement equal to 0, and the associated Rx TEG ID therefore indicates the default reference Rx TEG. The TRP ID in this measurement report indicates the reference TRP selection. The other N−1 DL-TDOA measurement reports may have non-zero RSTD values. Each of these DL-TDOA measurement reports also has an Rx-TEG field indicating a different Rx TEG than the default reference Rx TEG. The respective RSTD value may be calculated based on a time delta, as described above with reference to Option 2-2. This case is a mix between Option 2-1 and Option 2-2—it reuses the "NR-DL-TDOA-SignalMeasurementInformation" LPP IE 900 and RSTD reporting as defined in Option 2-1, but the reported measurements are similar to Option 2-2.

Referring again to the notation $$RSTD_{i,0}^{TEG_i^{x(i)},TEG_o^y},$$

in a second scenario (denoted "Case 2"), the location server may request a UE to optionally measure the same DL-PRS resource of multiple TRPs. In this case, each TRP should be measured with N different Rx TEGs.

As a first sub-scenario (denoted "Case 2-1"), all the TRPs are neighbour TRPs. In this case, the UE follows the current standard and reports all additional RSTDs for each TRP$_i$. For TRP$_i$, this set of measurements may be denoted as $$\left[ RSTD_{i,0}^{TEG_i^1,TEG_o^y} \ \ldots \ RSTD_{i,0}^{TEG_i^N,TEG_o^y} \right].$$

As a second sub-scenario (denoted "Case 2-2"), if one of the TRPs is the reference TRP, then there are two options. To simplify the discussion, two TRPs will be considered, TRP_0 (the reference TRP) and TRP_2 (a neighbor TRP), and N_0=N_2=N. For the first option, the UE may follow the current standard and report all the additional RSTD combinations. In this case, the total number of measurements reported would be (M−1)*N*N.

As a second option, the UE may report a list of $\Pi(N_i-1)$ RSTD measurements to deliver the extra measurements. As a first sub-option (denoted "Option 2-1), the UE may report the set of measurements denoted $$\left[\left[ RSTD_{1,0}^{TEG_1^{x(1)},TEG_o^1} \ \ldots \ RSTD_{M-1,0}^{TEG_{M-1}^{x(M-1)},TEG_o^1} \right], \\ \left[ RSTD_{1,0}^{TEG_1^{x(1)},TEG_o^2} \ \ldots \ RSTD_{1,0}^{TEG_1^{x(1)},TEG_o^N} \right], \\ \left[ RSTD_{2,0}^{TEG_2^2,TEG_o^1} \ \ldots \ RSTD_{2,0}^{TEG_2^N,TEG_o^1} \right]\right].$$

In this case, the total number of measurements reported is (M−1)+2*(N−1).

As a second sub-option (denoted "Option 2-2"), the UE may report the set of measurements denoted $$\left[\left[ RSTD_{1,0}^{TEG_1^{x(1)},TEG_o^1} \ \ldots \ RSTD_{M-1,0}^{TEG_{M-1}^{x(M-1)},TEG_o^1} \right], \left[ \text{Delta}^{TEG_0^2,TEG_o^1}, \\ \ldots, \text{Delta}^{TEG_0^N,TEG_o^1} \right], \left[ Delta^{TEG_2^2,TEG_2^1}, \ldots, \text{Delta}^{TEG_2^N,TEG_2^1} \right]\right].$$

In this case, the total number of measurements reported is again (M−1)+2*(N−1). Similar to Case 1, the UE may only report the additional measurements.

In various aspects, the techniques described above for DL-TDOA measurement reports can be applied to UL-TDOA. According to the current design, a TRP should report an RTOA to the location server for UL-TDOA-based positioning. Unlike an RSTD measurement, an RTOA measurement has no reference TRP ToA, as the reference is the TRP's own clock.

It has been proposed that the location server should be able to request a TRP to optionally measure the same SRS resource of a UE with N different TRP Rx TEGs and report the corresponding multiple RTOA measurements. Said another way, a TRP may receive a measurement request to report N RTOA measurements with N different Rx TEGs. This introduces the same type of issues as for a UE reporting multiple UE Rx TEGs. As such, the TRP can use similar reporting techniques to those described above. However, the TRP and the location server would communicate via NR positioning protocol type A (NRPPa) rather than LPP.

Figure 11:
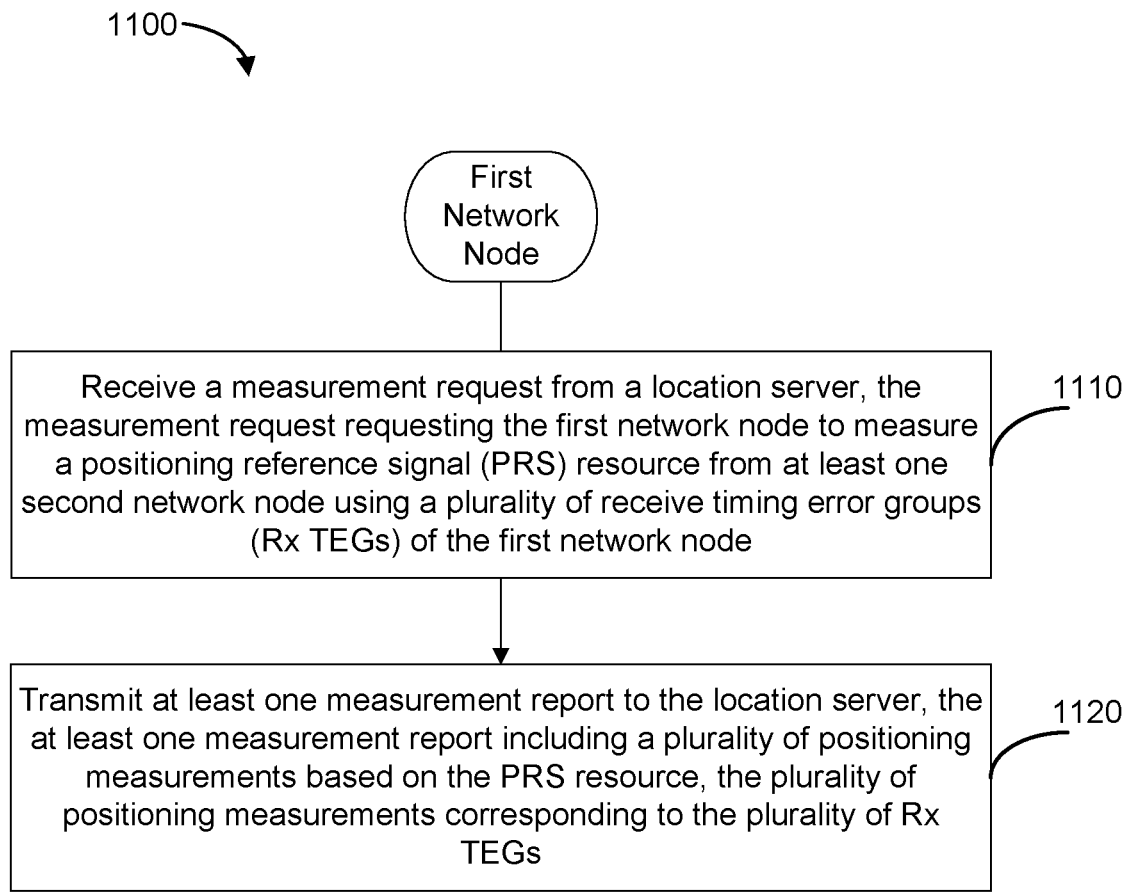
FIG. 11 illustrates an example method of wireless positioning, according to aspects of the disclosure.

FIG. 11 illustrates an example method 1100 of wireless positioning, according to aspects of the disclosure. In an aspect, method 1100 may be performed by a first network node (e.g., any of the UEs or base stations described herein).

At 1110, the first network node receives a measurement request (e.g., an LPP Request Location Information message as at stage 640) from a location server (e.g., LMF 270), the measurement request requesting the first network node to measure a PRS resource (e.g., DL-PRS, SRS, etc.) from at least one second network node using a plurality of Rx TEGs of the first network node. In an aspect, where the first network node is a UE, operation 1110 may be performed by the one or more WWAN transceivers 310, the one or more processors 332, memory 340, and/or positioning component 342, any or all of which may be considered means for performing this operation. In an aspect, where the first network node is a base station, operation 1110 may be performed by the one or more network transceivers 380, the one or more processors 384, memory 386, and/or positioning component 388, any or all of which may be considered means for performing this operation.

At 1120, the first network node transmits a measurement report (e.g., an LPP Provide Location Information message as at stage 660) to the location server, the measurement report including a plurality of positioning measurements (e.g., RSTD measurements, RTOA measurements) based on the PRS resource, the plurality of positioning measurements corresponding to the plurality of Rx TEGs. In an aspect, where the first network node is a UE, operation 1120 may be performed by the one or more WWAN transceivers 310, the one or more processors 332, memory 340, and/or positioning component 342, any or all of which may be considered means for performing this operation. In an aspect, where the first network node is a base station, operation 1110 may be performed by the one or more network transceivers 380, the one or more processors 384, memory 386, and/or positioning component 388, any or all of which may be considered means for performing this operation.

As will be appreciated, a technical advantage of the method 1100 is the ability to request and report positioning measurements associated with multiple Rx TEGs.

Clause 1. A method of wireless positioning performed by a first network node, comprising: receiving a measurement request from a location server, the measurement request requesting the first network node to measure a positioning reference signal (PRS) resource from at least one second network node using a plurality of receive timing error groups (Rx TEGs) of the first network node; and transmitting at least one measurement report to the location server, the at least one measurement report including a plurality of positioning measurements based on the PRS resource, the plurality of positioning measurements corresponding to the plurality of Rx TEGs.

Clause 2. The method of clause 1, wherein the measurement request includes a list of identifiers of the plurality of Rx TEGs, a requested number of the plurality of Rx TEGs, or both.

Clause 3. The method of any of clauses 1 to 2, further comprising: transmitting, before reception of the measurement request, a capability message to the location server, the capability message including a list of identifiers of the plurality of Rx TEGs, a number of the plurality of Rx TEGs, or both.

Clause 4. The method of any of clauses 1 to 3, wherein: the first network node is a user equipment (UE), the plurality of positioning measurements is a plurality of reference signal time difference (RSTD) measurements, the at least one second network node is a neighbor transmission-reception point (TRP), and each RSTD measurement of the plurality of RSTD measurements is associated in the at least one measurement report with one Rx TEG of the plurality of Rx TEGs, as in Cases 1-1 and 2-1.

Clause 5. The method of any of clauses 1 to 3, wherein: the first network node is a UE, the plurality of positioning measurements is a plurality of RSTD measurements, and the at least one second network node is a reference TRP.

Clause 6. The method of clause 5, wherein: the plurality of RSTD measurements comprises an RSTD measurement for each Rx TEG of the plurality of Rx TEGs for each pair of the reference TRP and a neighbor TRP, as in Case 1-2, Option 1.

Clause 7. The method of clause 5, wherein: the plurality of RSTD measurements comprises an RSTD measurement for each pair of the reference TRP and a neighbor TRP using a reference Rx TEG associated with the reference TRP, the plurality of RSTD measurements further comprises a plurality of additional RSTD measurements for one pair of the reference TRP and one neighbor TRP, and each additional RSTD measurement of the plurality of RSTD measurements is associated with one of the plurality of Rx TEGs, other than the reference Rx TEG, as in Case 1-2, Option 2-1.

Clause 8. The method of clause 7, wherein the at least one measurement report includes: a measurement list of the plurality of additional RSTD measurements, a first Rx TEG for a neighbor TRP and a second Rx TEG for the reference TRP, an Rx TEG identifier for each of the additional RSTD measurements, or any combination thereof, as discussed above with reference to FIG. 9.

Clause 9. The method of clause 5, wherein: the plurality of RSTD measurements comprises an RSTD measurement for each pair of the reference TRP and a neighbor TRP using a reference Rx TEG associated with the reference TRP, the at least one measurement report further includes a plurality of delta values for the plurality of Rx TEGs for the reference TRP, and the plurality of delta values represents timing differences caused by the plurality of Rx TEGs, as in Case 1-2, Option 2-2.

Clause 10. The method of clause 5, wherein: the plurality of RSTD measurements consists of an RSTD measurement for each of the plurality of Rx TEGs, other than a reference Rx TEG associated with the reference TRP, based on reuse of time-of-arrival (ToA) measurements of neighbor TRPs from a previous occasion, less than a threshold amount of movement, or both.

Clause 11. The method of any of clauses 5 to 10, wherein: the at least one measurement report comprises a plurality of measurement reports, each of the plurality of measurement reports includes one RSTD measurement of the plurality of RSTD measurements, one measurement report of the plurality of measurement reports includes an RSTD measurement equal to 0 to indicate a default reference Rx TEG and the reference TRP, and remaining measurement reports of the plurality of measurement reports include an Rx TEG identifier field indicating a different Rx TEG than the default reference Rx TEG.

Clause 12. The method of any of clauses 1 to 3 and 11, wherein: the first network node is a UE, the plurality of positioning measurements is a plurality of RSTD measurements, the at least one second network node comprises a plurality of neighbor TRPs, and the plurality of RSTD measurements comprises an RSTD measurement for each of the plurality of neighbor TRPs for each of the plurality of Rx TEGs, as in Case 2-1.

Clause 13. The method of any of clauses 1 to 3 and 11, wherein: the first network node is a UE, the plurality of positioning measurements is a plurality of RSTD measurements, and the at least one second network node comprises a reference TRP and at least one neighbor TRP, as in Case 2-2.

Clause 14. The method of clause 13, wherein: the plurality of RSTD measurements comprises an RSTD measurement for each Rx TEG of the plurality of Rx TEGs for each pair of the reference TRP and a neighbor TRP using a reference Rx TEG associated with the reference TRP, and the plurality of RSTD measurements further comprises an RSTD measurement for each of the plurality of Rx TEGs for a pair of the reference TRP and the at least one neighbor TRP, as in Case 2-2, Option 1.

Clause 15. The method of clause 13, wherein: the plurality of RSTD measurements comprises an RSTD measurement for each pair of the reference TRP and a neighbor TRP using a reference Rx TEG associated with the reference TRP, the plurality of RSTD measurements further comprises a first plurality of additional RSTD measurements for one pair of the reference TRP and one neighbor TRP, the plurality of RSTD measurements further comprises a second plurality of additional RSTD measurements for one pair of the reference TRP and the at least one neighbor TRP, and each additional RSTD measurement of the first plurality of RSTD measurements and the second plurality of RSTD measurements is associated with one of the plurality of Rx TEGs, other than the reference Rx TEG, as in Case 2-2, Option 2-1.

Clause 16. The method of clause 13, wherein: the plurality of RSTD measurements comprises an RSTD measurement for each pair of the reference TRP and a neighbor TRP using a reference Rx TEG associated with the reference TRP, the at least one measurement report further includes a first plurality of delta values for the plurality of Rx TEGs for the reference TRP, the at least one measurement report further includes a second plurality of delta values for the plurality of Rx TEGs for the at least one neighbor TRP, and the first plurality of delta values and the second plurality of delta values represent timing differences caused by the plurality of Rx TEGs, as in Case 2-2, Option 2-2.

Clause 17. The method of any of clauses 1 to 3, wherein: the first network node is a TRP, the at least one second network node is a UE, the plurality of positioning measurements is a plurality of relative time of arrival (RTOA) measurements, and the PRS resource is a sounding reference signal (SRS) resource.

Clause 18. A first network node, comprising: a memory; at least one transceiver; and at least one processor communicatively coupled to the memory and the at least one transceiver, the at least one processor configured to: receive, via the at least one transceiver, a measurement request from a location server, the measurement request requesting the first network node to measure a positioning reference signal (PRS) resource from at least one second network node using a plurality of receive timing error groups (Rx TEGs) of the first network node; and transmit, via the at least one transceiver, at least one measurement report to the location server, the at least one measurement report including a plurality of positioning measurements based on the PRS resource, the plurality of positioning measurements corresponding to the plurality of Rx TEGs.

Clause 19. The first network node of clause 18, wherein the measurement request includes a list of identifiers of the plurality of Rx TEGs, a requested number of the plurality of Rx TEGs, or both.

Clause 20. The first network node of any of clauses 18 to 19, wherein the at least one processor is further configured to: transmit, via the at least one transceiver, before reception of the measurement request, a capability message to the location server, the capability message including a list of identifiers of the plurality of Rx TEGs, a number of the plurality of Rx TEGs, or both.

Clause 21. The first network node of any of clauses 18 to 20, wherein: the first network node is a user equipment (UE), the plurality of positioning measurements is a plurality of reference signal time difference (RSTD) measurements, the at least one second network node is a neighbor transmission-reception point (TRP), and each RSTD measurement of the plurality of RSTD measurements is associated in the at least one measurement report with one Rx TEG of the plurality of Rx TEGs, as in Cases 1-1 and 2-1.

Clause 22. The first network node of any of clauses 18 to 20, wherein: the first network node is a UE, the plurality of positioning measurements is a plurality of RSTD measurements. and the at least one second network node is a reference TRP.

Clause 23. The first network node of clause 22, wherein: the plurality of RSTD measurements comprises an RSTD measurement for each Rx TEG of the plurality of Rx TEGs for each pair of the reference TRP and a neighbor TRP, as in Case 1-2, Option 1.

Clause 24. The first network node of clause 22, wherein: the plurality of RSTD measurements comprises an RSTD measurement for each pair of the reference TRP and a neighbor TRP using a reference Rx TEG associated with the reference TRP, the plurality of RSTD measurements further comprises a plurality of additional RSTD measurements for one pair of the reference TRP and one neighbor TRP, and each additional RSTD measurement of the plurality of RSTD measurements is associated with one of the plurality of Rx TEGs, other than the reference Rx TEG, as in Case 1-2, Option 2-1.

Clause 25. The first network node of clause 24, wherein the at least one measurement report includes: a measurement list of the plurality of additional RSTD measurements, a first Rx TEG for a neighbor TRP and a second Rx TEG for the reference TRP, an Rx TEG identifier for each of the additional RSTD measurements, or any combination thereof, as discussed above with reference to FIG. 9.

Clause 26. The first network node of clause 22, wherein: the plurality of RSTD measurements comprises an RSTD measurement for each pair of the reference TRP and a neighbor TRP using a reference Rx TEG associated with the reference TRP, the at least one measurement report further includes a plurality of delta values for the plurality of Rx TEGs for the reference TRP, and the plurality of delta values represents timing differences caused by the plurality of Rx TEGs, as in Case 1-2, Option 2-2.

Clause 27. The first network node of clause 22, wherein: the plurality of RSTD measurements consists of an RSTD measurement for each of the plurality of Rx TEGs, other than a reference Rx TEG associated with the reference TRP, based on reuse of time-of-arrival (ToA) measurements of neighbor TRPs from a previous occasion, less than a threshold amount of movement, or both.

Clause 28. The first network node of any of clauses 22 to 27, wherein: the at least one measurement report comprises a plurality of measurement reports, each of the plurality of measurement reports includes one RSTD measurement of the plurality of RSTD measurements, one measurement report of the plurality of measurement reports includes an RSTD measurement equal to 0 to indicate a default reference Rx TEG and the reference TRP, and remaining measurement reports of the plurality of measurement reports include an Rx TEG identifier field indicating a different Rx TEG than the default reference Rx TEG.

Clause 29. The first network node of any of clauses 18 to 20 and 28, wherein: the first network node is a UE, the plurality of positioning measurements is a plurality of RSTD measurements, the at least one second network node comprises a plurality of neighbor TRPs, and the plurality of RSTD measurements comprises an RSTD measurement for each of the plurality of neighbor TRPs for each of the plurality of Rx TEGs, as in Case 2-1.

Clause 30. The first network node of any of clauses 18 to 20 and 28, wherein: the first network node is a UE, the plurality of positioning measurements is a plurality of RSTD measurements, and the at least one second network node comprises a reference TRP and at least one neighbor TRP, as in Case 2-2.

Clause 31. The first network node of clause 30, wherein: the plurality of RSTD measurements comprises an RSTD measurement for each Rx TEG of the plurality of Rx TEGs for each pair of the reference TRP and a neighbor TRP using a reference Rx TEG associated with the reference TRP, and the plurality of RSTD measurements further comprises an RSTD measurement for each of the plurality of Rx TEGs for a pair of the reference TRP and the at least one neighbor TRP, as in Case 2-2, Option 1.

Clause 32. The first network node of clause 30, wherein: the plurality of RSTD measurements comprises an RSTD measurement for each pair of the reference TRP and a neighbor TRP using a reference Rx TEG associated with the reference TRP, the plurality of RSTD measurements further comprises a first plurality of additional RSTD measurements for one pair of the reference TRP and one neighbor TRP, the plurality of RSTD measurements further comprises a second plurality of additional RSTD measurements for one pair of the reference TRP and the at least one neighbor TRP, and each additional RSTD measurement of the first plurality of RSTD measurements and the second plurality of RSTD measurements is associated with one of the plurality of Rx TEGs, other than the reference Rx TEG, as in Case 2-2, Option 2-1.

Clause 33. The first network node of clause 30, wherein: the plurality of RSTD measurements comprises an RSTD measurement for each pair of the reference TRP and a neighbor TRP using a reference Rx TEG associated with the reference TRP, the at least one measurement report further includes a first plurality of delta values for the plurality of Rx TEGs for the reference TRP, the at least one measurement report further includes a second plurality of delta values for the plurality of Rx TEGs for the at least one neighbor TRP, and the first plurality of delta values and the second plurality of delta values represent timing differences caused by the plurality of Rx TEGs, as in Case 2-2, Option 2-2.

Clause 34. The first network node of any of clauses 18 to 20, wherein: the first network node is a TRP, the at least one second network node is a UE, the plurality of positioning measurements is a plurality of relative time of arrival (RTOA) measurements, and the PRS resource is a sounding reference signal (SRS) resource.

Clause 35. A first network node, comprising: means for receiving a measurement request from a location server, the measurement request requesting the first network node to measure a positioning reference signal (PRS) resource from at least one second network node using a plurality of receive timing error groups (Rx TEGs) of the first network node; and means for transmitting at least one measurement report to the location server, the at least one measurement report including a plurality of positioning measurements based on the PRS resource, the plurality of positioning measurements corresponding to the plurality of Rx TEGs.

Clause 36. The first network node of clause 35, wherein the measurement request includes a list of identifiers of the plurality of Rx TEGs, a requested number of the plurality of Rx TEGs, or both.

Clause 37. The first network node of any of clauses 35 to 36, further comprising: means for transmitting, before reception of the measurement request, a capability message to the location server, the capability message including a list of identifiers of the plurality of Rx TEGs, a number of the plurality of Rx TEGs, or both.

Clause 38. The first network node of any of clauses 35 to 37, wherein: the first network node is a user equipment (UE), the plurality of positioning measurements is a plurality of reference signal time difference (RSTD) measurements, the at least one second network node is a neighbor transmission-reception point (TRP), and each RSTD measurement of the plurality of RSTD measurements is associated in the at least one measurement report with one Rx TEG of the plurality of Rx TEGs, as in Cases 1-1 and 2-1.

Clause 39. The first network node of any of clauses 35 to 37, wherein: the first network node is a UE, the plurality of positioning measurements is a plurality of RSTD measurements. and the at least one second network node is a reference TRP.

Clause 40. The first network node of clause 39, wherein: the plurality of RSTD measurements comprises an RSTD measurement for each Rx TEG of the plurality of Rx TEGs for each pair of the reference TRP and a neighbor TRP, as in Case 1-2, Option 1.

Clause 41. The first network node of clause 39, wherein: the plurality of RSTD measurements comprises an RSTD measurement for each pair of the reference TRP and a neighbor TRP using a reference Rx TEG associated with the reference TRP, the plurality of RSTD measurements further comprises a plurality of additional RSTD measurements for one pair of the reference TRP and one neighbor TRP, and each additional RSTD measurement of the plurality of RSTD measurements is associated with one of the plurality of Rx TEGs, other than the reference Rx TEG, as in Case 1-2, Option 2-1.

Clause 42. The first network node of clause 41, wherein the at least one measurement report includes: a measurement list of the plurality of additional RSTD measurements, a first Rx TEG for a neighbor TRP and a second Rx TEG for the reference TRP, an Rx TEG identifier for each of the additional RSTD measurements, or any combination thereof, as discussed above with reference to FIG. 9.

Clause 43. The first network node of clause 39, wherein: the plurality of RSTD measurements comprises an RSTD measurement for each pair of the reference TRP and a neighbor TRP using a reference Rx TEG associated with the reference TRP, the at least one measurement report further includes a plurality of delta values for the plurality of Rx TEGs for the reference TRP, and the plurality of delta values represents timing differences caused by the plurality of Rx TEGs, as in Case 1-2, Option 2-2.

Clause 44. The first network node of clause 39, wherein: the plurality of RSTD measurements consists of an RSTD measurement for each of the plurality of Rx TEGs, other than a reference Rx TEG associated with the reference TRP, based on reuse of time-of-arrival (ToA) measurements of neighbor TRPs from a previous occasion, less than a threshold amount of movement, or both.

Clause 45. The first network node of any of clauses 39 to 44, wherein: the at least one measurement report comprises a plurality of measurement reports, each of the plurality of measurement reports includes one RSTD measurement of the plurality of RSTD measurements, one measurement report of the plurality of measurement reports includes an RSTD measurement equal to 0 to indicate a default reference Rx TEG and the reference TRP, and remaining measurement reports of the plurality of measurement reports include an Rx TEG identifier field indicating a different Rx TEG than the default reference Rx TEG.

Clause 46. The first network node of any of clauses 35 to 37 and 45, wherein: the first network node is a UE, the plurality of positioning measurements is a plurality of RSTD measurements, the at least one second network node comprises a plurality of neighbor TRPs, and the plurality of RSTD measurements comprises an RSTD measurement for each of the plurality of neighbor TRPs for each of the plurality of Rx TEGs, as in Case 2-1.

Clause 47. The first network node of any of clauses 35 to 37 and 45, wherein: the first network node is a UE, the plurality of positioning measurements is a plurality of RSTD measurements, and the at least one second network node comprises a reference TRP and at least one neighbor TRP, as in Case 2-2.

Clause 48. The first network node of clause 47, wherein: the plurality of RSTD measurements comprises an RSTD measurement for each Rx TEG of the plurality of Rx TEGs for each pair of the reference TRP and a neighbor TRP using a reference Rx TEG associated with the reference TRP, and the plurality of RSTD measurements further comprises an RSTD measurement for each of the plurality of Rx TEGs for a pair of the reference TRP and the at least one neighbor TRP, as in Case 2-2, Option 1.

Clause 49. The first network node of clause 47, wherein: the plurality of RSTD measurements comprises an RSTD measurement for each pair of the reference TRP and a neighbor TRP using a reference Rx TEG associated with the reference TRP, the plurality of RSTD measurements further comprises a first plurality of additional RSTD measurements for one pair of the reference TRP and one neighbor TRP, the plurality of RSTD measurements further comprises a second plurality of additional RSTD measurements for one pair of the reference TRP and the at least one neighbor TRP, and each additional RSTD measurement of the first plurality of RSTD measurements and the second plurality of RSTD measurements is associated with one of the plurality of Rx TEGs, other than the reference Rx TEG, as in Case 2-2, Option 2-1.

Clause 50. The first network node of clause 47, wherein: the plurality of RSTD measurements comprises an RSTD measurement for each pair of the reference TRP and a neighbor TRP using a reference Rx TEG associated with the reference TRP, the at least one measurement report further includes a first plurality of delta values for the plurality of Rx TEGs for the reference TRP, the at least one measurement report further includes a second plurality of delta values for the plurality of Rx TEGs for the at least one neighbor TRP, and the first plurality of delta values and the second plurality of delta values represent timing differences caused by the plurality of Rx TEGs, as in Case 2-2, Option 2-2.

Clause 51. The first network node of any of clauses 35 to 37, wherein: the first network node is a TRP, the at least one second network node is a UE, the plurality of positioning measurements is a plurality of relative time of arrival (RTOA) measurements, and the PRS resource is a sounding reference signal (SRS) resource.

Clause 52. A non-transitory computer-readable medium storing computer-executable instructions that, when executed by a first network node, cause the first network node to: receive a measurement request from a location server, the measurement request requesting the first network node to measure a positioning reference signal (PRS) resource from at least one second network node using a plurality of receive timing error groups (Rx TEGs) of the first network node; and transmit at least one measurement report to the location server, the at least one measurement report including a plurality of positioning measurements based on the PRS resource, the plurality of positioning measurements corresponding to the plurality of Rx TEGs.

Clause 53. The non-transitory computer-readable medium of clause 52, wherein the measurement request includes a list of identifiers of the plurality of Rx TEGs, a requested number of the plurality of Rx TEGs, or both.

Clause 54. The non-transitory computer-readable medium of any of clauses 52 to 53, further comprising computer-executable instructions that, when executed by the first network node, cause the first network node to: transmit, before reception of the measurement request, a capability message to the location server, the capability message including a list of identifiers of the plurality of Rx TEGs, a number of the plurality of Rx TEGs, or both.

Clause 55. The non-transitory computer-readable medium of any of clauses 52 to 54, wherein: the first network node is a user equipment (UE), the plurality of positioning measurements is a plurality of reference signal time difference (RSTD) measurements, the at least one second network node is a neighbor transmission-reception point (TRP), and each RSTD measurement of the plurality of RSTD measurements is associated in the at least one measurement report with one Rx TEG of the plurality of Rx TEGs, as in Cases 1-1 and 2-1.

Clause 56. The non-transitory computer-readable medium of any of clauses 52 to 54, wherein: the first network node is a UE, the plurality of positioning measurements is a plurality of RSTD measurements. and the at least one second network node is a reference TRP.

Clause 57. The non-transitory computer-readable medium of clause 56, wherein: the plurality of RSTD measurements comprises an RSTD measurement for each Rx TEG of the plurality of Rx TEGs for each pair of the reference TRP and a neighbor TRP, as in Case 1-2, Option 1.

Clause 58. The non-transitory computer-readable medium of clause 56, wherein: the plurality of RSTD measurements comprises an RSTD measurement for each pair of the reference TRP and a neighbor TRP using a reference Rx TEG associated with the reference TRP, the plurality of RSTD measurements further comprises a plurality of additional RSTD measurements for one pair of the reference TRP and one neighbor TRP, and each additional RSTD measurement of the plurality of RSTD measurements is associated with one of the plurality of Rx TEGs, other than the reference Rx TEG, as in Case 1-2, Option 2-1.

Clause 59. The non-transitory computer-readable medium of clause 58, wherein the at least one measurement report includes: a measurement list of the plurality of additional RSTD measurements, a first Rx TEG for a neighbor TRP and a second Rx TEG for the reference TRP, an Rx TEG identifier for each of the additional RSTD measurements, or any combination thereof, as discussed above with reference to FIG. 9.

Clause 60. The non-transitory computer-readable medium of clause 56, wherein: the plurality of RSTD measurements comprises an RSTD measurement for each pair of the reference TRP and a neighbor TRP using a reference Rx TEG associated with the reference TRP, the at least one measurement report further includes a plurality of delta values for the plurality of Rx TEGs for the reference TRP, and the plurality of delta values represents timing differences caused by the plurality of Rx TEGs, as in Case 1-2, Option 2-2.

Clause 61. The non-transitory computer-readable medium of clause 56, wherein: the plurality of RSTD measurements consists of an RSTD measurement for each of the plurality of Rx TEGs, other than a reference Rx TEG associated with the reference TRP, based on reuse of time-of-arrival (ToA) measurements of neighbor TRPs from a previous occasion, less than a threshold amount of movement, or both.

Clause 62. The non-transitory computer-readable medium of any of clauses 56 to 61, wherein: the at least one measurement report comprises a plurality of measurement reports, each of the plurality of measurement reports includes one RSTD measurement of the plurality of RSTD measurements, one measurement report of the plurality of measurement reports includes an RSTD measurement equal to 0 to indicate a default reference Rx TEG and the reference TRP, and remaining measurement reports of the plurality of measurement reports include an Rx TEG identifier field indicating a different Rx TEG than the default reference Rx TEG.

Clause 63. The non-transitory computer-readable medium of any of clauses 52 to 54 and 61, wherein: the first network node is a UE, the plurality of positioning measurements is a plurality of RSTD measurements, the at least one second network node comprises a plurality of neighbor TRPs, and the plurality of RSTD measurements comprises an RSTD measurement for each of the plurality of neighbor TRPs for each of the plurality of Rx TEGs, as in Case 2-1.

Clause 64. The non-transitory computer-readable medium of any of clauses 52 to 54 and 61, wherein: the first network node is a UE, the plurality of positioning measurements is a plurality of RSTD measurements, and the at least one second network node comprises a reference TRP and at least one neighbor TRP, as in Case 2-2.

Clause 65. The non-transitory computer-readable medium of clause 64, wherein: the plurality of RSTD measurements comprises an RSTD measurement for each Rx TEG of the plurality of Rx TEGs for each pair of the reference TRP and a neighbor TRP using a reference Rx TEG associated with the reference TRP, and the plurality of RSTD measurements further comprises an RSTD measurement for each of the plurality of Rx TEGs for a pair of the reference TRP and the at least one neighbor TRP, as in Case 2-2, Option 1.

Clause 66. The non-transitory computer-readable medium of clause 64, wherein: the plurality of RSTD measurements comprises an RSTD measurement for each pair of the reference TRP and a neighbor TRP using a reference Rx TEG associated with the reference TRP, the plurality of RSTD measurements further comprises a first plurality of additional RSTD measurements for one pair of the reference TRP and one neighbor TRP, the plurality of RSTD measurements further comprises a second plurality of additional RSTD measurements for one pair of the reference TRP and the at least one neighbor TRP, and each additional RSTD measurement of the first plurality of RSTD measurements and the second plurality of RSTD measurements is associated with one of the plurality of Rx TEGs, other than the reference Rx TEG, as in Case 2-2, Option 2-1.

Clause 67. The non-transitory computer-readable medium of clause 64, wherein: the plurality of RSTD measurements comprises an RSTD measurement for each pair of the reference TRP and a neighbor TRP using a reference Rx TEG associated with the reference TRP, the at least one measurement report further includes a first plurality of delta values for the plurality of Rx TEGs for the reference TRP, the at least one measurement report further includes a second plurality of delta values for the plurality of Rx TEGs for the at least one neighbor TRP, and the first plurality of delta values and the second plurality of delta values represent timing differences caused by the plurality of Rx TEGs, as in Case 2-2, Option 2-2.

Clause 68. The non-transitory computer-readable medium of any of clauses 52 to 54, wherein: the first network node is a TRP, the at least one second network node is a UE, the plurality of positioning measurements is a plurality of relative time of arrival (RTOA) measurements, and the PRS resource is a sounding reference signal (SRS) resource.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless positioning performed by a first network node, comprising:
    receiving a measurement request from a location server, the measurement request requesting the first network node to measure a positioning reference signal (PRS) resource from at least one second network node using a plurality of receive timing error groups (Rx TEGs) of the first network node; and
    transmitting at least one measurement report to the location server, the at least one measurement report including a plurality of positioning measurements based on the PRS resource, the plurality of positioning measurements corresponding to the plurality of Rx TEGs.

2. The method of claim 1, wherein the measurement request includes a list of identifiers of the plurality of Rx TEGs, a requested number of the plurality of Rx TEGs, or both.

3. The method of claim 1, further comprising:
    transmitting, before reception of the measurement request, a capability message to the location server, the capability message including a list of identifiers of the plurality of Rx TEGs, a number of the plurality of Rx TEGs, or both.

4. The method of claim 1, wherein:
    the first network node is a user equipment (UE),
    the plurality of positioning measurements is a plurality of reference signal time difference (RSTD) measurements,
    the at least one second network node is a neighbor transmission-reception point (TRP), and
    each RSTD measurement of the plurality of RSTD measurements is associated in the at least one measurement report with one Rx TEG of the plurality of Rx TEGs.

5. The method of claim 1, wherein:
    the first network node is a UE,
    the plurality of positioning measurements is a plurality of RSTD measurements, and
    the at least one second network node is a reference TRP.

6. The method of claim 5, wherein:
    the plurality of RSTD measurements comprises an RSTD measurement for each Rx TEG of the plurality of Rx TEGs for each pair of the reference TRP and a neighbor TRP.

7. The method of claim 5, wherein:
    the plurality of RSTD measurements comprises an RSTD measurement for each pair of the reference TRP and a neighbor TRP using a reference Rx TEG associated with the reference TRP,
    the plurality of RSTD measurements further comprises a plurality of additional RSTD measurements for one pair of the reference TRP and one neighbor TRP, and each additional RSTD measurement of the plurality of RSTD measurements is associated with one of the plurality of Rx TEGs, other than the reference Rx TEG.

8. The method of claim 7, wherein the at least one measurement report includes:
a measurement list of the plurality of additional RSTD measurements,
a first Rx TEG for a neighbor TRP and a second Rx TEG for the reference TRP,
an Rx TEG identifier for each of the additional RSTD measurements, or
any combination thereof.

9. The method of claim 5, wherein:
the plurality of RSTD measurements comprises an RSTD measurement for each pair of the reference TRP and a neighbor TRP using a reference Rx TEG associated with the reference TRP,
the at least one measurement report further includes a plurality of delta values for the plurality of Rx TEGs for the reference TRP, and
the plurality of delta values represents timing differences caused by the plurality of Rx TEGs.

10. The method of claim 5, wherein:
the plurality of RSTD measurements consists of an RSTD measurement for each of the plurality of Rx TEGs, other than a reference Rx TEG associated with the reference TRP, based on reuse of time-of-arrival (ToA) measurements of neighbor TRPs from a previous occasion, less than a threshold amount of movement, or both.

11. The method of claim 5, wherein:
the at least one measurement report comprises a plurality of measurement reports,
each of the plurality of measurement reports includes one RSTD measurement of the plurality of RSTD measurements,
one measurement report of the plurality of measurement reports includes an RSTD measurement equal to 0 to indicate a default reference Rx TEG and the reference TRP, and
remaining measurement reports of the plurality of measurement reports include an Rx TEG identifier field indicating a different Rx TEG than the default reference Rx TEG.

12. The method of claim 1, wherein:
the first network node is a UE,
the plurality of positioning measurements is a plurality of RSTD measurements,
the at least one second network node comprises a plurality of neighbor TRPs, and
the plurality of RSTD measurements comprises an RSTD measurement for each of the plurality of neighbor TRPs for each of the plurality of Rx TEGs.

13. The method of claim 1, wherein:
the first network node is a UE,
the plurality of positioning measurements is a plurality of RSTD measurements, and
the at least one second network node comprises a reference TRP and at least one neighbor TRP.

14. The method of claim 13, wherein:
the plurality of RSTD measurements comprises an RSTD measurement for each Rx TEG of the plurality of Rx TEGs for each pair of the reference TRP and a neighbor TRP using a reference Rx TEG associated with the reference TRP, and the plurality of RSTD measurements further comprises an RSTD measurement for each of the plurality of Rx TEGs for a pair of the reference TRP and the at least one neighbor TRP.

15. The method of claim 13, wherein:
the plurality of RSTD measurements comprises an RSTD measurement for each pair of the reference TRP and a neighbor TRP using a reference Rx TEG associated with the reference TRP,
the plurality of RSTD measurements further comprises a first plurality of additional RSTD measurements for one pair of the reference TRP and one neighbor TRP,
the plurality of RSTD measurements further comprises a second plurality of additional RSTD measurements for one pair of the reference TRP and the at least one neighbor TRP, and
each additional RSTD measurement of the first plurality of RSTD measurements and the second plurality of RSTD measurements is associated with one of the plurality of Rx TEGs, other than the reference Rx TEG.

16. The method of claim 13, wherein:
the plurality of RSTD measurements comprises an RSTD measurement for each pair of the reference TRP and a neighbor TRP using a reference Rx TEG associated with the reference TRP,
the at least one measurement report further includes a first plurality of delta values for the plurality of Rx TEGs for the reference TRP,
the at least one measurement report further includes a second plurality of delta values for the plurality of Rx TEGs for the at least one neighbor TRP, and
the first plurality of delta values and the second plurality of delta values represent timing differences caused by the plurality of Rx TEGs.

17. The method of claim 1, wherein:
the first network node is a TRP,
the at least one second network node is a UE,
the plurality of positioning measurements is a plurality of relative time of arrival (RTOA) measurements, and
the PRS resource is a sounding reference signal (SRS) resource.

18. A first network node, comprising:
a memory;
at least one transceiver; and
at least one processor communicatively coupled to the memory and the at least one transceiver, the at least one processor configured to:
receive, via the at least one transceiver, a measurement request from a location server, the measurement request requesting the first network node to measure a positioning reference signal (PRS) resource from at least one second network node using a plurality of receive timing error groups (Rx TEGs) of the first network node; and
transmit, via the at least one transceiver, at least one measurement report to the location server, the at least one measurement report including a plurality of positioning measurements based on the PRS resource, the plurality of positioning measurements corresponding to the plurality of Rx TEGs.

19. The first network node of claim 18, wherein:
the first network node is a user equipment (UE),
the plurality of positioning measurements is a plurality of reference signal time difference (RSTD) measurements,
the at least one second network node is a neighbor transmission-reception point (TRP), and each RSTD measurement of the plurality of RSTD measurements is associated in the at least one measurement report with one Rx TEG of the plurality of Rx TEGs.

20. The first network node of claim 18, wherein:
the first network node is a UE,
the plurality of positioning measurements is a plurality of RSTD measurements, and
the at least one second network node is a reference TRP.

21. The first network node of claim 20, wherein:
the plurality of RSTD measurements comprises an RSTD measurement for each Rx TEG of the plurality of Rx TEGs for each pair of the reference TRP and a neighbor TRP.

22. The first network node of claim 20, wherein:
the plurality of RSTD measurements comprises an RSTD measurement for each pair of the reference TRP and a neighbor TRP using a reference Rx TEG associated with the reference TRP,
the plurality of RSTD measurements further comprises a plurality of additional RSTD measurements for one pair of the reference TRP and one neighbor TRP, and
each additional RSTD measurement of the plurality of RSTD measurements is associated with one of the plurality of Rx TEGs, other than the reference Rx TEG.

23. The first network node of claim 20, wherein:
the plurality of RSTD measurements comprises an RSTD measurement for each pair of the reference TRP and a neighbor TRP using a reference Rx TEG associated with the reference TRP,
the at least one measurement report further includes a plurality of delta values for the plurality of Rx TEGs for the reference TRP, and
the plurality of delta values represents timing differences caused by the plurality of Rx TEGs.

24. The first network node of claim 18, wherein:
the first network node is a UE,
the plurality of positioning measurements is a plurality of RSTD measurements,
the at least one second network node comprises a plurality of neighbor TRPs, and
the plurality of RSTD measurements comprises an RSTD measurement for each of the plurality of neighbor TRPs for each of the plurality of Rx TEGs.

25. The first network node of claim 18, wherein:
the first network node is a UE,
the plurality of positioning measurements is a plurality of RSTD measurements, and
the at least one second network node comprises a reference TRP and at least one neighbor TRP.

26. The first network node of claim 25, wherein:
the plurality of RSTD measurements comprises an RSTD measurement for each Rx TEG of the plurality of Rx TEGs for each pair of the reference TRP and a neighbor TRP using a reference Rx TEG associated with the reference TRP, and
the plurality of RSTD measurements further comprises an RSTD measurement for each of the plurality of Rx TEGs for a pair of the reference TRP and the at least one neighbor TRP.

27. The first network node of claim 25, wherein:
the plurality of RSTD measurements comprises an RSTD measurement for each pair of the reference TRP and a neighbor TRP using a reference Rx TEG associated with the reference TRP,
the plurality of RSTD measurements further comprises a first plurality of additional RSTD measurements for one pair of the reference TRP and one neighbor TRP,
the plurality of RSTD measurements further comprises a second plurality of additional RSTD measurements for one pair of the reference TRP and the at least one neighbor TRP, and
each additional RSTD measurement of the first plurality of RSTD measurements and the second plurality of RSTD measurements is associated with one of the plurality of Rx TEGs, other than the reference Rx TEG.

28. The first network node of claim 25, wherein:
the plurality of RSTD measurements comprises an RSTD measurement for each pair of the reference TRP and a neighbor TRP using a reference Rx TEG associated with the reference TRP,
the at least one measurement report further includes a first plurality of delta values for the plurality of Rx TEGs for the reference TRP,
the at least one measurement report further includes a second plurality of delta values for the plurality of Rx TEGs for the at least one neighbor TRP, and
the first plurality of delta values and the second plurality of delta values represent timing differences caused by the plurality of Rx TEGs.

29. A first network node, comprising:
means for receiving a measurement request from a location server, the measurement request requesting the first network node to measure a positioning reference signal (PRS) resource from at least one second network node using a plurality of receive timing error groups (Rx TEGs) of the first network node; and
means for transmitting at least one measurement report to the location server, the at least one measurement report including a plurality of positioning measurements based on the PRS resource, the plurality of positioning measurements corresponding to the plurality of Rx TEGs.

30. A non-transitory computer-readable medium storing computer-executable instructions that, when executed by a first network node, cause the first network node to:
receive a measurement request from a location server, the measurement request requesting the first network node to measure a positioning reference signal (PRS) resource from at least one second network node using a plurality of receive timing error groups (Rx TEGs) of the first network node; and
transmit at least one measurement report to the location server, the at least one measurement report including a plurality of positioning measurements based on the PRS resource, the plurality of positioning measurements corresponding to the plurality of Rx TEGs.

* * * * *